US012694504B2

(12) United States Patent
Dixon et al.

(10) Patent No.: US 12,694,504 B2
(45) Date of Patent: Jul. 28, 2026

(54) INSPECTION SYSTEMS AND METHODS FOR DETERMINING MATCHES BETWEEN SETS OF IMAGES OF ROTARY PARTS

(71) Applicant: General Electric Company, Schenectady, NY (US)

(72) Inventors: Walter V. Dixon, Delanson, NY (US); James Vradenburg Miller, Clifton Park, NY (US)

(73) Assignee: General Electric Company, Evendale, OH (US)

( * ) Notice: Subject to any disclaimer, the term of this patent is extended or adjusted under 35 U.S.C. 154(b) by 641 days.

(21) Appl. No.: 17/684,304

(22) Filed: Mar. 1, 2022

(65) Prior Publication Data

US 2023/0281790 A1     Sep. 7, 2023

(51) Int. Cl.
G06T 7/00          (2017.01)

(52) U.S. Cl.
CPC .... G06T 7/001 (2013.01); *G06T 2207/30164* (2013.01)

(58) Field of Classification Search
CPC .................................................... G06T 7/0004
See application file for complete search history.

(56) References Cited

U.S. PATENT DOCUMENTS 6,205,240 B1   3/2001  Pietrzak
6,748,112 B1   6/2004  Nguyen 7,327,857 B2   2/2008  Lloyd, Jr.
7,706,912 B2   4/2010  Grant
8,010,315 B2   8/2011  Wu
(Continued)

FOREIGN PATENT DOCUMENTS

CN        102567995       7/2012
CN        104115162       10/2014
(Continued)

OTHER PUBLICATIONS

Arbelaez, P. et al., "Multiscale Combinatorial Grouping", Proceedings of the IEEE Conference on Computer Vision and Pattern Recognition, Mar. 1, 2016, 8 pp.
(Continued)

*Primary Examiner* — Benjamin O Dulaney
(74) *Attorney, Agent, or Firm* — Fitch, Even, Tabin & Flannery LLP

(57)          ABSTRACT

Devices and methods are provided herein useful to aligning or linking together data from multiple inspections of a part. In some embodiments, the inspection methods include detecting key points on inspection data associated with the part, such as images. Key points provide the locations of features of interest on the part. Key points for the part are represented by feature descriptors. The inspection methods then link together data from two or more inspections by matching the feature descriptors and calculating a distance between matched key points. The inspection methods identify the proper alignment of inspection data from two or more inspections by identifying the alignment that achieves a minimum distance between matched key points on the inspection data. In this manner, the inspection methods align or link together inspection data from two or more different inspections to enable the comparative analysis of inspection data for a part.

22 Claims, 11 Drawing Sheets

(56) References Cited

U.S. PATENT DOCUMENTS

| | | | |
|---|---|---|---|
| 8,414,264 | B2 | 4/2013 | Bolms |
| 8,431,917 | B2 | 4/2013 | Wang |
| 8,818,078 | B2 | 8/2014 | Telfer |
| 9,042,634 | B2 | 5/2015 | George |
| 9,305,345 | B2 | 4/2016 | Lim |
| 9,310,312 | B2 | 4/2016 | Jahnke |
| 9,317,781 | B2 | 4/2016 | Tu |
| 9,366,600 | B2 | 6/2016 | Ruhge |
| 9,747,683 | B2 | 8/2017 | Subramaniyan |
| 9,785,919 | B2 | 10/2017 | Diwinsky |
| 9,824,437 | B2 | 11/2017 | Mullins |
| 9,976,967 | B2 | 5/2018 | Bense |
| 10,191,479 | B2 | 1/2019 | Lim |
| 10,445,871 | B2 | 10/2019 | Lim |
| 10,551,327 | B2 | 2/2020 | Nayeri |
| 10,621,717 | B2 | 4/2020 | Wang |
| 10,628,938 | B2 | 4/2020 | Kobayashi |
| 10,679,066 | B2 | 6/2020 | Pathak |
| 10,691,985 | B2 | 6/2020 | Lim |
| 10,755,401 | B2 | 8/2020 | Bian |
| 10,859,637 | B2 | 12/2020 | Ramey |
| 10,928,362 | B2 | 2/2021 | Finn |
| 10,984,085 | B2* | 4/2021 | Hosseinbor ............. G06F 18/22 |
| 2010/0183217 | A1 | 7/2010 | Seung |
| 2010/0266175 | A1 | 10/2010 | Seung |
| 2010/0266212 | A1 | 10/2010 | Maurer |
| 2013/0114878 | A1* | 5/2013 | Scheid .................... G06T 7/001 |
| | | | 382/141 |
| 2015/0169998 | A1 | 6/2015 | Rabinovich |
| 2016/0292876 | A1 | 10/2016 | Zhao |
| 2016/0307072 | A1 | 10/2016 | Zhou |
| 2017/0038307 | A1 | 2/2017 | Ohta |
| 2017/0178308 | A1* | 6/2017 | Subramaniyan .......... G06T 7/11 |
| 2017/0280082 | A1 | 9/2017 | Aoyama |
| 2017/0372117 | A1 | 12/2017 | Bredno |
| 2018/0336454 | A1 | 11/2018 | Lim |
| 2019/0287266 | A1* | 9/2019 | Takahashi ........ G06K 19/06028 |
| 2019/0304077 | A1* | 10/2019 | Wang .................... G06V 20/46 |
| 2020/0058161 | A1 | 2/2020 | Remine |
| 2020/0114497 | A1 | 4/2020 | Graham |
| 2020/0114528 | A1 | 4/2020 | Graham |
| 2020/0193552 | A1* | 6/2020 | Turkelson ............. G06F 18/213 |
| 2020/0279132 | A1* | 9/2020 | Nogami .................. G06F 18/23 |
| 2021/0073266 | A1* | 3/2021 | Nakagawa ......... G06Q 30/0643 |
| 2021/0229269 | A1 | 7/2021 | Graham |
| 2021/0229270 | A1 | 7/2021 | Graham |
| 2021/0231239 | A1 | 7/2021 | Graham |
| 2021/0295559 | A1* | 9/2021 | Huang .................... H04N 23/90 |
| 2022/0083809 | A1* | 3/2022 | Aggarwal ................ G06N 5/04 |
| 2022/0100988 | A1* | 3/2022 | Yamamoto ............... G06N 3/09 |
| 2022/0404460 | A1* | 12/2022 | Liu .......................... G01S 17/89 |
| 2023/0206605 | A1* | 6/2023 | Aoki ....................... G06V 10/28 |
| | | | 382/115 |
| 2023/0298348 | A1* | 9/2023 | Lu .......................... G06V 10/82 |
| | | | 382/103 |

FOREIGN PATENT DOCUMENTS

| | | |
|---|---|---|
| CN | 105574215 | 5/2016 |
| EP | 2616799 | 7/2013 |
| EP | 3049793 | 8/2016 |
| JP | 2020160658 | 10/2020 |
| WO | 2014205231 | 12/2014 |
| WO | 201922918 | 1/2019 |

OTHER PUBLICATIONS

Boykov, Y. et al., "Graph Cuts and Efficient N-D Image Segmentation", International journal of computer vision, 70(2):109-131, 2006, 23 pp.

Chen, L. et al., "DeepLab: Semantic Image Segmentation with Deep Convolutional Nets, Atrous Convolution, and Fully Connected CRFs", ICLR, 2015, 14 pp.

Chen, Y. et al., "Multi-instance Object Segmentation with Occlusion Handling", Proceedings of the IEEE Conference on Computer Vision and Pattern Recognition, pp. 3470-3478, 2015, 9 pp.

Comaniciu, D. et al., "Mean shift: A Robust Approach Toward Feature Space Analysis", IEEE Transactions on pattern analysis and machine intelligence, 24(5):603-619, 2002, 37 pp.

Dai, J. et al., "Instance-aware Semantic Segmentation via Multi-task Network Cascades", CVPR, 2016, 9 pp.

Dai, J. et al., "Instance-sensitive Fully Convolutional Networks", Computer Vision-ECCV, arXiv preprint arXiv:1603.08678, Mar. 29, 2016, 15 pp.

Everingham, M. et al., "The Pascal Visual Object Classes (VOC) Challenge", International Journal of Computer Vision, Springer, 88(2):303-338, 2010, 36 pp.

Felzenszwalb, P. et al., "Efficient graph-based image segmentation", International Journal of Computer Vision, Kluwer Academic Publishers, manufactured in the Netherlands, 59(2):167-181, 2004, 15 pp.

Gedas, B. et al., "Semantic Segmentation with Boundary Neural Fields", Journal of Cornell University Library, p. 01-09, arXiv preprint arXiv:1511.02674, May 24, 2016, 9 pp.

Girshick, R. et al., "Fast R-CNN", Proceedings of the IEEE International Conference on Computer Vision, pp. 1440-1448, 2015, 9 pp.

Girshick, R. et al., "Region based Convolutional Networks for Accurate Object Detection and Segmentation", Pattern Analysis and Machine Intelligence, IEEE Transactions 38(1):142-158, 2016, 16 pp.

Hariharan, B. et al., "Hyper-columns for Object Segmentation and Fine-grained Localization", Proceedings of the IEEE Conference on Computer Vision and Pattern Recognition, pp. 447-456, arXiv preprint arXiv:1411.5752, Nov. 21, 2014, 10 pp.

Hariharan, B. et al., "Semantic Contours from Inverse Detectors", 2011 International Conference on Computer Vision, pp. 991-998, 8 pp.

Hariharan, B. et al., "Simultaneous Detection and Segmentation", Computer vision ECCV 2014, pp. 297-312, Springer, arXiv preprint arXiv:1407.1808, Jul. 7, 2014, 16 pp.

Hosang, J. et al., "What Makes for Effective Detection Proposals?", IEEE transactions on pattern analysis and machine intelligence, 38(4):814-830, arXiv preprint arXiv:1502.05082, Aug. 1, 2015, 16 pp.

Jia, Y. et al., "Caffe: Convolutional Architecture for Fast Feature Embedding", arXiv preprint arXiv:1408.5093, 2014, 4 pp.

Jin, L. et al., "Object Detection Free Instance Segmentation With Labeling Transformations", arXiv preprint arXiv:1611.08991, Nov. 29, 2016, 10 pp.

Ladicky, L. et al., "What, Where and How Many? Combining Object Detectors and CRFs", European conference on computer vision, pp. 424-437, Springer, 2010, 16 pp.

Li, K. et al., "Amodal Instance Segmentation", arXiv preprint arXiv:1604.08202, Aug. 17, 2016, 23 pp.

Li, K. et al., "Iterative Instance Segmentation", CVPR, arXiv preprint arXiv: 1511.08498, Jun. 10, 2016, 9 pp.

Li, Y. et al., "Fully Convolutional Instance-aware Semantic Segmentation", Journal of Cornell University Library, p. 01-09, Nov. 23, 2016, 9 pp.

Liang, X. et al., "Proposal-free Network for Instance-level Object Segmentation", arXiv preprint arXiv:1509.02636, Sep. 10, 2015, 14 pp.

Liang, X. et al., "Reversible Recursive Instance-level Object Segmentation", arXiv preprint arXiv:1511.04517, Nov. 18, 2015, 9 pp.

Lin, G. et al., "Efficient Piecewise Training of Deep Structured Models for Semantic Segmentation", CVPR, 2016, 10 pp.

Long, J. et al., "Fully Convolutional Networks for Semantic Segmentation", Proceedings of the IEEE Conference on Computer Vision and Pattern Recognition, pp. 3431-3440, arXiv preprint arXiv:1411.4038, Mar. 8, 2015, 10 pp.

Maire, M. et al., "Affinity CNN: Learning Pixel-Centric Pairwise Relations for Figure/Ground Embedding", Journal of Cornell University Library, arXiv preprint arXiv:1512.02767, Apr. 11, 2016, 11 pp.

(56) References Cited

OTHER PUBLICATIONS

Ng, Y. et al., "On Spectral Clustering: Analysis and an Algorithm", Advances in neural information processing systems, 2:849-856, Jan. 3, 2001, 8 pp.

Pinheiro, P. et al., "Learning to Segment Object Candidates", Advances in Neural Information Processing Systems, arXiv preprint arXiv:1506.06204v2 [cs.CV] , Sep. 1, 2015, 9 pp.

Pinheiro, P. et al., "Learning to Refine Object Segments", arXiv preprint arXiv:1506.06204, Sep. 1, 2015, 18 pp.

Ren, S. et al., "Faster R-CNN: Towards Real-Time Object Detection with Region Proposal Networks", Advances in Neural Information Processing Systems, arXiv preprint arXiv:1511.08250, Jan. 6, 2016, 14 pp.

Romera-Paredes, B. et al., "Recurrent Instance Segmentation", arXiv preprint arXiv:1511.08250, Oct. 24, 2016, 24 pp.

Shi, J. et al., "Normalized Cuts and Image Segmentation", IEEE Transactions on pattern analysis and machine intelligence, 22(8):888-905, Aug. 1, 2000, 20 pp.

Simonyan, K. et al., "Very Deep Convolutional Networks for Large-scale Image Recognition", arXiv preprint arXiv:1409.1556, Apr. 10, 2015, 14 pp.

Uhrig, J. et al., "Pixel-level Encoding and Depth Layering for Instance-level Semantic Labeling", Journal of Cornell University Library, arXiv preprint arXiv:1604.05096, Jul. 14, 2016, 17 pp.

Ujlings, J.R. et al., "Selective Search for Object Recognition", International Journal of Computer Vision, 104(2):154-171, 2013, 18 pp.

Xu, Y. et al., "Gland Instance Segmentation by Deep Multichannel Neural Networks", Journal of Cornell University Library, arXiv preprint arXiv:1604.05096, Jul. 19, 2016, 10 pp.

Yao, J. et al., "Describing the scene as a whole: Joint object detection, scene classification and semantic segmentation", Computer Vision and Pattern Recognition (CVPR), 2012 IEEE Conference, pp. 702-709, IEEE, 2012, 8 pp.

Zhang, Z. et al., "Instance-level Segmentation with Deep Densely Connected Mrfs.", Journal of Cornell University Library, arXiv preprint arXiv:1512.06735, Apr. 27, 2016, 9 pp.

Zheng, S. et al., "Conditional Random Fields as Recurrent Neural Networks", Proceedings of the IEEE International Conference on Computer Vision (ICCV), pp. 1529-1537, 2015, 9 pp.

* cited by examiner

Figure 2:
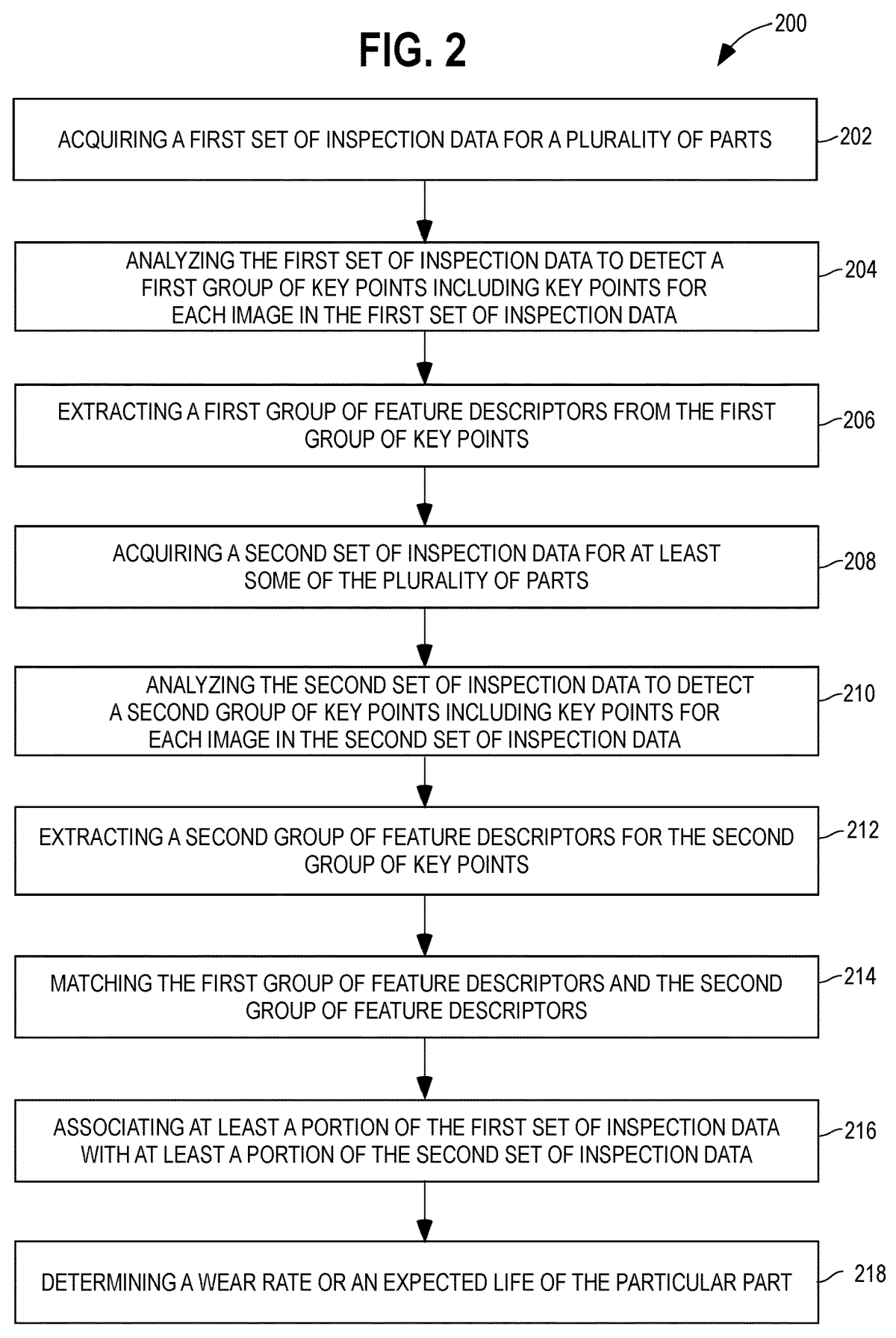

| | |
|---|---|
| ACQUIRING A FIRST SET OF INSPECTION DATA FOR A PLURALITY OF PARTS | 202 |

| | |
|---|---|
| ANALYZING THE FIRST SET OF INSPECTION DATA TO DETECT A FIRST GROUP OF KEY POINTS INCLUDING KEY POINTS FOR EACH IMAGE IN THE FIRST SET OF INSPECTION DATA | 204 |

| | |
|---|---|
| EXTRACTING A FIRST GROUP OF FEATURE DESCRIPTORS FROM THE FIRST GROUP OF KEY POINTS | 206 |

| | |
|---|---|
| ACQUIRING A SECOND SET OF INSPECTION DATA FOR AT LEAST SOME OF THE PLURALITY OF PARTS | 208 |

| | |
|---|---|
| ANALYZING THE SECOND SET OF INSPECTION DATA TO DETECT A SECOND GROUP OF KEY POINTS INCLUDING KEY POINTS FOR EACH IMAGE IN THE SECOND SET OF INSPECTION DATA | 210 |

| | |
|---|---|
| EXTRACTING A SECOND GROUP OF FEATURE DESCRIPTORS FOR THE SECOND GROUP OF KEY POINTS | 212 |

| | |
|---|---|
| MATCHING THE FIRST GROUP OF FEATURE DESCRIPTORS AND THE SECOND GROUP OF FEATURE DESCRIPTORS | 214 |

| | |
|---|---|
| ASSOCIATING AT LEAST A PORTION OF THE FIRST SET OF INSPECTION DATA WITH AT LEAST A PORTION OF THE SECOND SET OF INSPECTION DATA | 216 |

| | |
|---|---|
| DETERMINING A WEAR RATE OR AN EXPECTED LIFE OF THE PARTICULAR PART | 218 |

300

FIRST SET OF INSPECTION DATA 310

| IMAGE 1 | KEY POINT 1 | KEY POINT 2 | KEY POINT i |
| IMAGE 2 | KEY POINT 1 | KEY POINT 2 | KEY POINT i |
| • • • | • • • | • • • | • • • |
| IMAGE n | KEY POINT 1 | KEY POINT 2 | KEY POINT i |

SECOND SET OF INSPECTION DATA 320

| IMAGE 1 | KEY POINT 1 | KEY POINT 2 | KEY POINT j |
| IMAGE 2 | KEY POINT 1 | KEY POINT 2 | KEY POINT j |
| • • • | • • • | • • • | • • • |
| IMAGE m | KEY POINT 1 | KEY POINT 2 | KEY POINT j |

FIG. 5

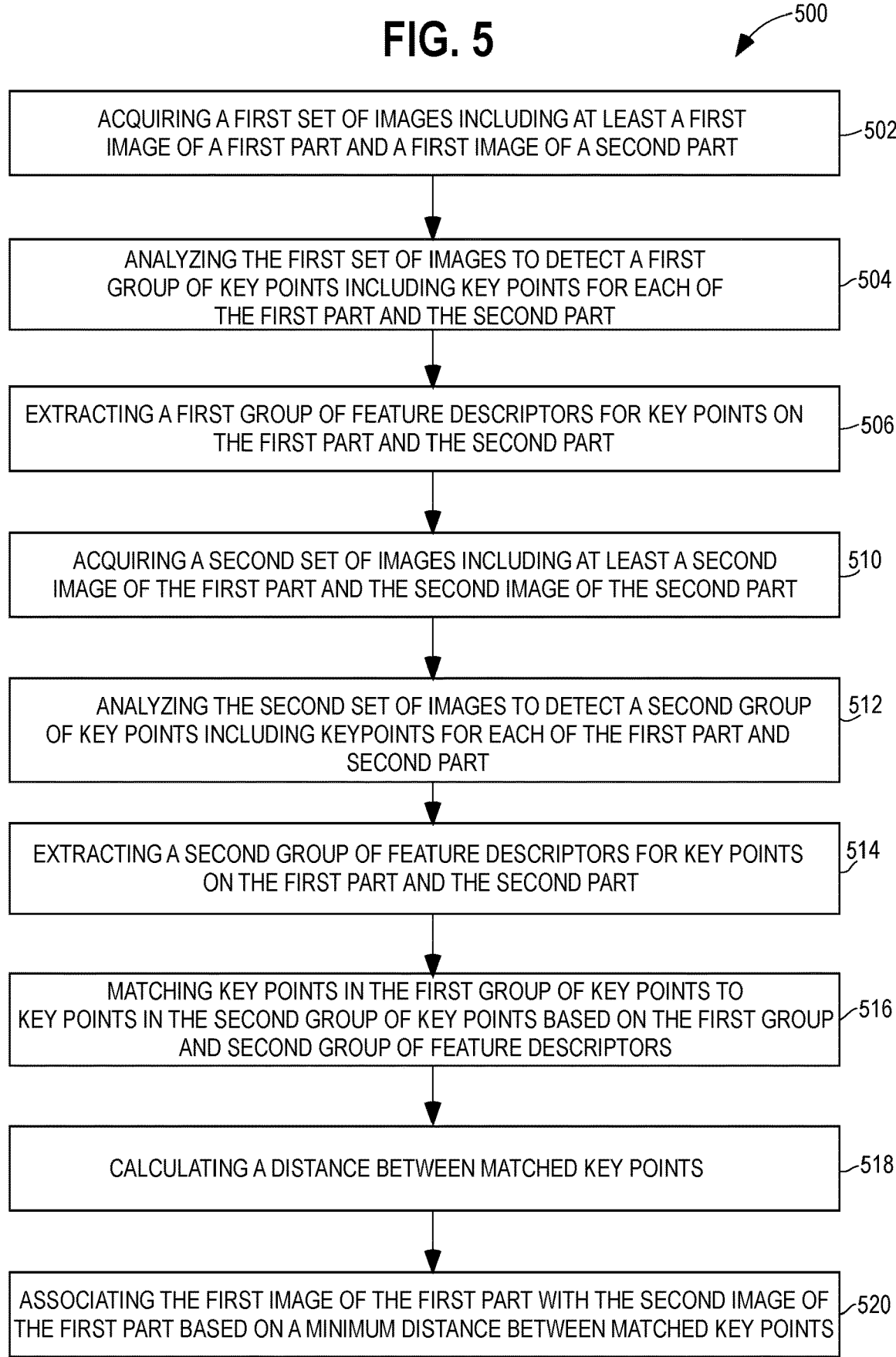

ACQUIRING A FIRST SET OF IMAGES INCLUDING AT LEAST A FIRST IMAGE OF A FIRST PART AND A FIRST IMAGE OF A SECOND PART — 502

ANALYZING THE FIRST SET OF IMAGES TO DETECT A FIRST GROUP OF KEY POINTS INCLUDING KEY POINTS FOR EACH OF THE FIRST PART AND THE SECOND PART — 504

EXTRACTING A FIRST GROUP OF FEATURE DESCRIPTORS FOR KEY POINTS ON THE FIRST PART AND THE SECOND PART — 506

ACQUIRING A SECOND SET OF IMAGES INCLUDING AT LEAST A SECOND IMAGE OF THE FIRST PART AND THE SECOND IMAGE OF THE SECOND PART — 510

ANALYZING THE SECOND SET OF IMAGES TO DETECT A SECOND GROUP OF KEY POINTS INCLUDING KEYPOINTS FOR EACH OF THE FIRST PART AND SECOND PART — 512

EXTRACTING A SECOND GROUP OF FEATURE DESCRIPTORS FOR KEY POINTS ON THE FIRST PART AND THE SECOND PART — 514

MATCHING KEY POINTS IN THE FIRST GROUP OF KEY POINTS TO KEY POINTS IN THE SECOND GROUP OF KEY POINTS BASED ON THE FIRST GROUP AND SECOND GROUP OF FEATURE DESCRIPTORS — 516

CALCULATING A DISTANCE BETWEEN MATCHED KEY POINTS — 518

ASSOCIATING THE FIRST IMAGE OF THE FIRST PART WITH THE SECOND IMAGE OF THE FIRST PART BASED ON A MINIMUM DISTANCE BETWEEN MATCHED KEY POINTS — 520

FIG. 7

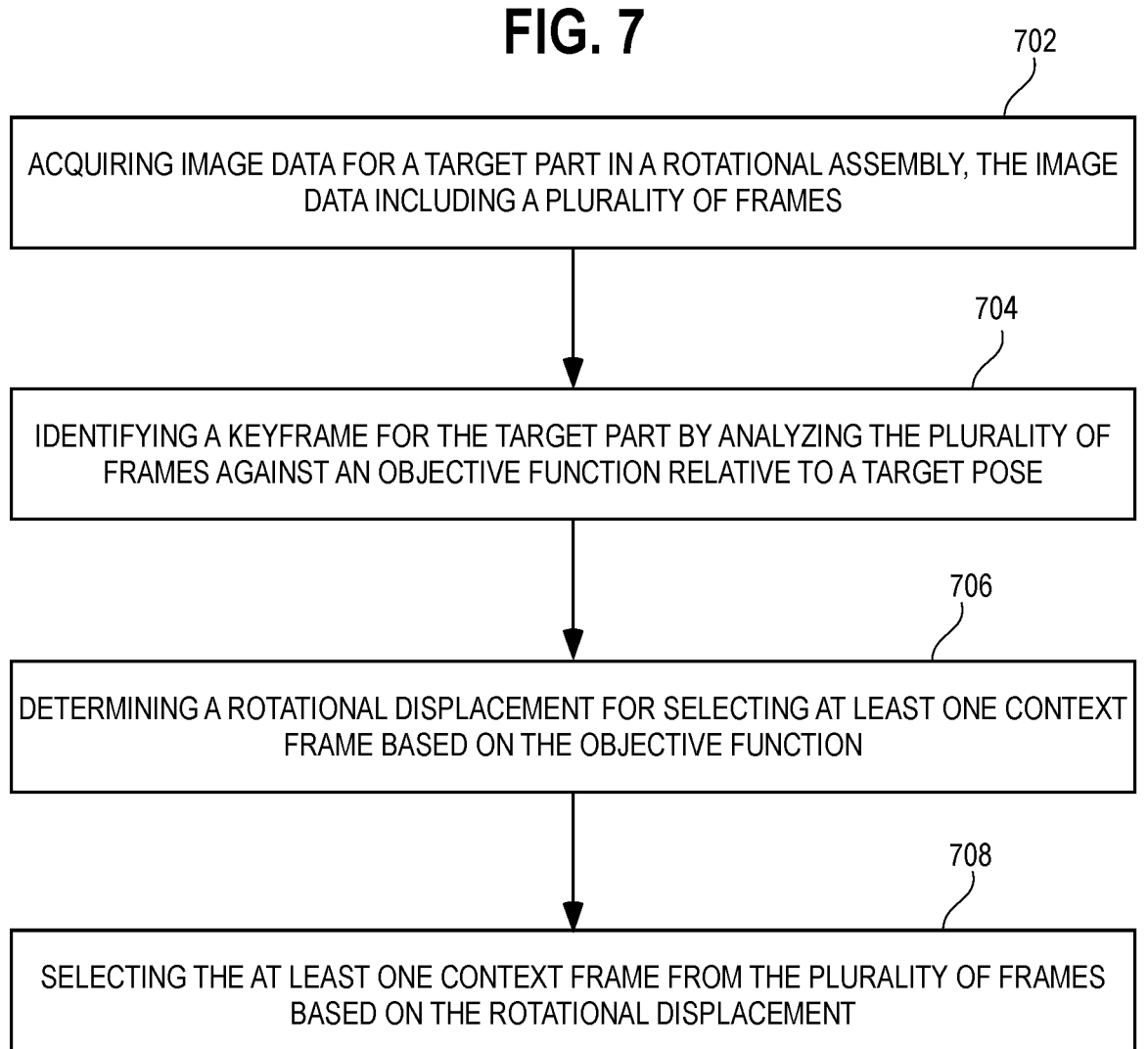

702

ACQUIRING IMAGE DATA FOR A TARGET PART IN A ROTATIONAL ASSEMBLY, THE IMAGE DATA INCLUDING A PLURALITY OF FRAMES

704

IDENTIFYING A KEYFRAME FOR THE TARGET PART BY ANALYZING THE PLURALITY OF FRAMES AGAINST AN OBJECTIVE FUNCTION RELATIVE TO A TARGET POSE

706

DETERMINING A ROTATIONAL DISPLACEMENT FOR SELECTING AT LEAST ONE CONTEXT FRAME BASED ON THE OBJECTIVE FUNCTION

708

SELECTING THE AT LEAST ONE CONTEXT FRAME FROM THE PLURALITY OF FRAMES BASED ON THE ROTATIONAL DISPLACEMENT

FIG. 9

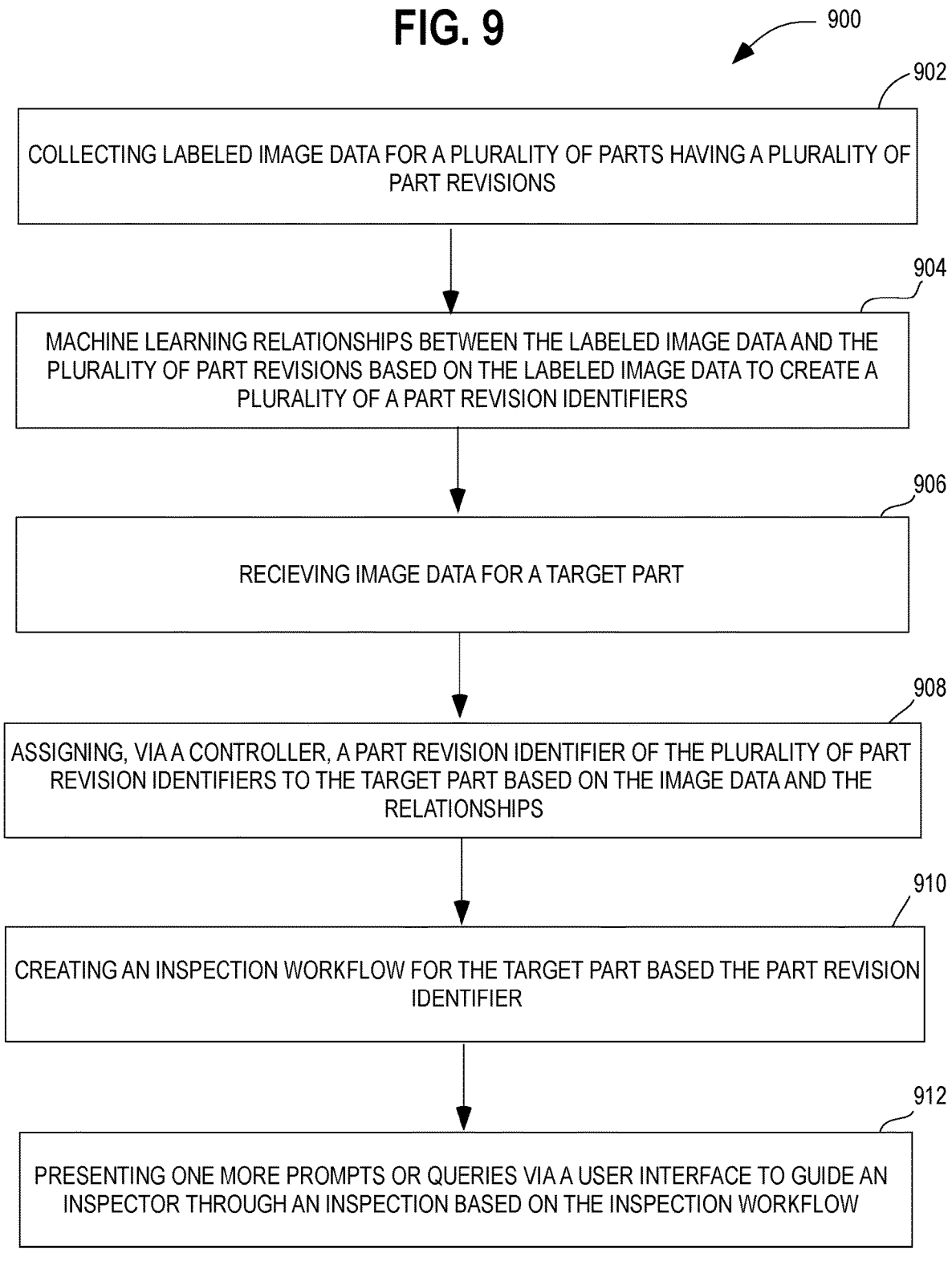

900

902

COLLECTING LABELED IMAGE DATA FOR A PLURALITY OF PARTS HAVING A PLURALITY OF PART REVISIONS

904

MACHINE LEARNING RELATIONSHIPS BETWEEN THE LABELED IMAGE DATA AND THE PLURALITY OF PART REVISIONS BASED ON THE LABELED IMAGE DATA TO CREATE A PLURALITY OF A PART REVISION IDENTIFIERS

906

RECIEVING IMAGE DATA FOR A TARGET PART

908

ASSIGNING, VIA A CONTROLLER, A PART REVISION IDENTIFIER OF THE PLURALITY OF PART REVISION IDENTIFIERS TO THE TARGET PART BASED ON THE IMAGE DATA AND THE RELATIONSHIPS

910

CREATING AN INSPECTION WORKFLOW FOR THE TARGET PART BASED THE PART REVISION IDENTIFIER

912

PRESENTING ONE MORE PROMPTS OR QUERIES VIA A USER INTERFACE TO GUIDE AN INSPECTOR THROUGH AN INSPECTION BASED ON THE INSPECTION WORKFLOW

INSPECTION SYSTEMS AND METHODS FOR DETERMINING MATCHES BETWEEN SETS OF IMAGES OF ROTARY PARTS

TECHNICAL FIELD

This technical field relates generally to the inspection of parts and, more specifically, to the inspection of parts of rotational assemblies, such as airfoils in an engine.

BACKGROUND

Comparative analysis may be used to understand the progression of wear for an individual asset. Comparative analysis techniques may involve the visual inspection of parts, for example, using a borescope style inspection tool to assess the condition of the asset over a period of time.

The assessment of wear in certain assemblies, however, is often based on the most recent inspection as it may be challenging to link data from a historical inspection to the precise location of a recent inspection. Linking together or aligning data from historical and recent inspections may become more challenging when the asset being inspected is part of a rotational assembly, such as airfoils.

BRIEF DESCRIPTION OF THE DRAWINGS

Provided herein are methods and system for analyzing inspection data from multiple inspections.

FIG. 2 is a flow diagram of aspects of an inspection method, in accordance with some embodiments.

FIG. 5 is a flow diagram of aspects of an inspection method, in accordance with some embodiments.

FIG. 7 is a flow diagram of a method for identifying context frames for a target part, in accordance with some embodiments.

FIG. 9 is a flow diagram of a method for identifying a part revision for a target part, in accordance with some embodiments.

Figure 1:
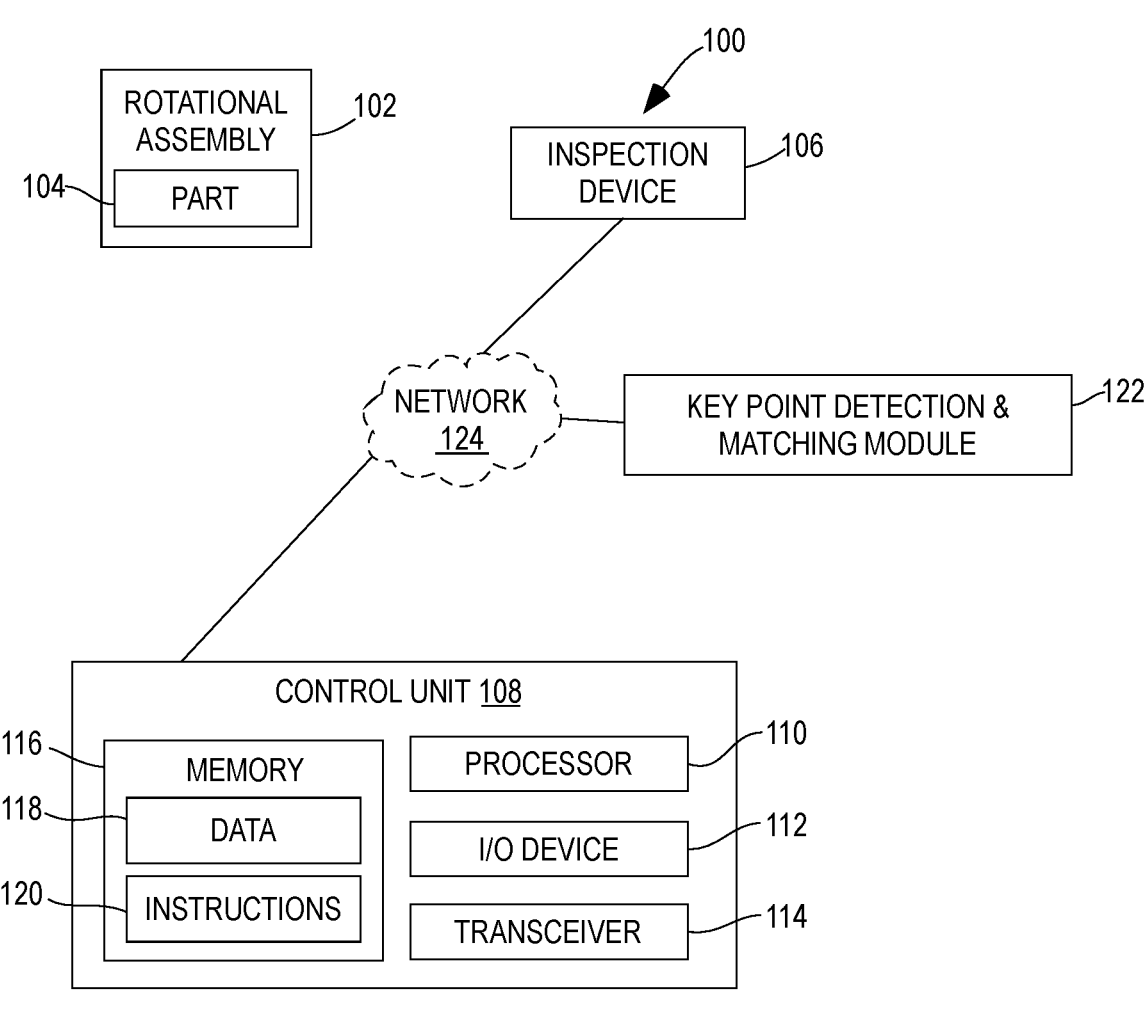
FIG. 1 is a block diagram of an inspection system, in accordance with some embodiments.

Elements in the figures are illustrated for simplicity and clarity and have not necessarily been drawn to scale. For example, the dimensions and/or relative positioning of some of the elements in the figures may be exaggerated relative to other elements to aid in understanding various embodiments. Also, common but well-understood elements that are useful or necessary in a commercially feasible embodiment are often not depicted to facilitate a less obstructed view of these various embodiments.

DETAILED DESCRIPTION

Provided herein are inspection systems and methods useful to align or link together sets of inspection data, such as images, from two or more different inspections. Because the sets of inspection data may include images for a plurality of parts which are unmarked, it may be difficult to link images to from a first inspection to images from a second inspection. By enabling the alignment of inspection data from two or more inspections, the inspection systems and methods provided herein facilitate the comparative analysis of inspection data and may be used to assess the progression of wear or to forecast the remaining life of a part.

To facilitate such a comparative analysis, the inspection systems and methods use key point detection to identify and describe features of interest on a part or portions thereof. The inspection systems and methods detect key points by analyzing inspection data, such as images, associated with the part. Key points provide the locations of various features of interest on the part. The inspection systems and methods determine feature descriptors which provide a numerical fingerprint for the key points on the part. The inspection systems and methods then link together data from two or more inspections by comparing feature descriptors to match key points among a plurality of parts and by calculating a distance between matched key points. Proper alignment of inspection data from two or more inspections is determined by identifying the alignment that achieves a minimum distance between matched key points. In this manner, the inspection systems and methods align or link together inspection data from two or more different inspections to enable wear tracking for a part.

The inspection systems and methods provided herein provide a means for linking inspection data from different inspections without including special markings or other indicators such as chamfers on a part to a establish a reference. Such markings or indicators may fade, become covered by dust, or be removed by wear on the part and, accordingly, may not reliably establish a reference between different inspections. Further, the inspection systems and methods do not rely on segmentation of recognized patterns of damage. Instead, the inspection systems and methods described herein recognize any distinguishable feature, such as corner geometry, for a part. That is, the inspection systems and methods detect key points which identify features on inspection data, such as an image. Such features may include spallation, damage from a foreign object, discoloration patterns, etc. Key points act as a feature detector, which then includes information pertaining to the detected feature (i.e., a feature descriptor). Feature descriptors are then used in determining the best match for data from two or more different inspections. Thus, by employing key point detection, the inspection systems and methods agnostically detect patterns in the inspection data, regardless of the type of feature. Such an approach provides robustness against parts lacking damage or lacking particular distinctive features.

Additionally, at least some of the inspection systems and methods provided herein may not rely on learning-based algorithms to link or align inspection data. Rather, the inspection systems and methods may use key point detection and matching to link or align inspection data from two or more different inspections. In this manner, the inspection systems and methods do not require training data for a part of interest to achieve the alignment of inspection data.

Images, as used herein, may include any representation capable of visible display, of an object or of inspection data of an object such as photos, graphical schematics, videos, etc. or other representations captured by any of the inspection devices described herein.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

FIG. 1 illustrates an inspection system 100 for linking inspection data from two or more inspections. The inspection system 100 includes an inspection device 106, a control unit 108, and a key point detection and matching module 122. The inspection system 100 may be employed to inspect a rotational assembly 102. The rotational assembly 102 includes a plurality of parts 104. In some embodiments, the rotational assembly 102 is an engine and the parts 104 are airfoils, such as turbine blades, vanes and/or compressor airfoils. Although FIG. 1 depicts a rotational assembly 102, it is contemplated that the inspection system 100 may be employed with any assembly having a plurality of component parts.

The inspection device 106 is configured to capture inspection data for one or more parts 104 of the rotational assembly 102 or portions thereof. In some approaches, the inspection device 106 is an imaging device such as a camera. It is contemplated that the imaging device may capture still or video images. In other approaches, the inspection device 106 may be an infrared detector, an eddy current instrument, an ultrasound machine, a computerized tomography (CT) scanner, or an X-ray fluorescence spectrometer. Thus, the inspection data may be in the form of image data, infrared data, eddy current data, or ultrasound data. It is also contemplated that the inspection device may be in the form of a rigid borescope, a flexible borescope, a rigid endoscope, or a flexible endoscope. The inspection device 106 is in communication with the control unit 108 and may be configured to transmit inspection data to the control unit 108.

In some approaches, the inspection device 106 may be coupled to a stationary component such as a nozzle or shroud. For example, the inspection device 106 may be coupled to a stationary component and configured to inspect one or more rotating parts (e.g., for nozzle or shroud inspection). In one non-limiting example, a camera may be coupled to a stationary part such that the camera is in in a fixed position (e.g., in a borescope port) adjacent to a rotational assembly 102 and may capture various surfaces of the rotational assembly 102, for example, as the rotational assembly 102 rotates and different surfaces move into a field of view of the camera. In other approaches, the inspection device 106 may be coupled to a rotary part. For example, the inspection device 106 may be coupled to a rotary part and configured to inspect one or more stationary parts. In one non-limiting example, a camera may be coupled to the rotational assembly 102 (e.g., a blade in an engine) such that turning the rotational assembly 102 places various stationary components positioned around the engine within a field of view of the camera.

The control unit 108 may function as a computing device to perform the functions and methods described herein. The control unit 108 may include one or more processors 110, input/output (I/O) devices 112, transceivers 114, and memory devices 116. The processors 110 may include any suitable processing device such as a microprocessor, microcontroller, integrated circuit, logic device, or other suitable processing device. The processors 110 may be used to execute or assist in executing the steps of the processes, methods, functionality and techniques described herein, and to control various communications, decisions, programs, content, listings, services, interfaces, logging, reporting, etc. Further, the one or more processors 110 may access the memory devices 116, which may store instructions 120, code and the like that are implemented by the processors 110 to implement intended functionality.

The memory devices 116 typically include one or more processor-readable and/or computer-readable media accessed by at least the processors 110 and may include volatile and/or nonvolatile media, such as RAM, ROM, EEPROM, flash memory and/or other memory technology. Further, the memory devices 116 are shown as internal to the control unit 108; however, the memory devices 116 may be internal, external or a combination of internal and external memory. Similarly, some or all of the memory devices 116 can be internal, external or a combination of internal and external memory of the processors 110. The memory devices 116 may be substantially any relevant memory such as, but not limited to, solid-state storage devices or drives, hard drive, one or more of universal serial bus (USB) stick or drive, flash memory secure digital (SD) card, other memory cards, and other such memory or combinations of two or more of such memory, and some or all of the memory may be distributed at multiple locations over a computer network. The memory devices 116 may store data 118 such as code, software, executables, scripts, data, content, lists, programming, programs, log or history data, engine information, component information, and the like. While FIG. 1 illustrates the various components being coupled together via a bus, it is understood that the various components may actually be coupled to the control unit 108 and/or one or more other components directly.

Typically, the control unit 108 further includes one or more communication interfaces, ports, or transceivers 114 and the like allowing the control unit 108 to communicate over a communication bus, a distributed computer, and/or a communication network (e.g., a local area network (LAN), the Internet, wide area network (WAN), etc.) with other devices and/or other such communications or combinations of two or more such communication methods. Further, the transceivers 114 may be configured for wired, wireless, optical, fiber optical cable, satellite, or other such communication configurations or combinations of two or more such communications.

The I/O devices 112 may be any relevant port or combinations of ports, such as but not limited to USB, Ethernet, or other such ports. The I/O devices 112 may be configured to allow wired and/or wireless communication coupling to external components. For example, the I/O devices 112 may provide wired communication and/or wireless communication (e.g., Wi-Fi, Bluetooth, cellular, RF, and/or other such wireless communication), and in some instances may include any suitable wired and/or wireless interfacing device, circuit and/or connecting device, such as but not limited to one or more transmitters, receivers, transceivers, or combination of two or more of such devices.

The inspection system 100 further includes a key point detection and matching module 122. While illustrated as a separate module, it is contemplated that the key point detection and matching module 122 or portions thereof may be incorporated into the control unit 108. In particular, the processor 110 may be employed to conduct key point detection and matching as performed by the key point detection and matching module 122. The key point detection and matching module 122 may be configured to receive data from the inspection device 106. The key point detection and matching module 122 may also be configured to detect one or more key points associated with the inspection data. In some approaches, the key point detection and matching module 122 includes one or more key point detection algorithms capable of identifying key points on an image. The key point detection and matching module 122 may also be configured to perform key point matching.

As illustrated in FIG. 1, the various components of the inspection system 100 may communicate directly or indirectly, such as over one or more distributed communication networks, such as network 124. For example, the network 124 may include LAN, WAN, Internet, cellular, Wi-Fi, and other such communication networks or combinations of two or more such networks.

In operation, the inspection device 106 is used to acquire inspection data for one or more parts 104 of the rotational assembly 102. It is contemplated that the inspection device 106 need not capture inspection data for an entire part but may capture inspection data for one or more portions of a part. The inspection device 106 then transmits, directly or indirectly, the inspection data to the control unit 108 and/or to the key point detection and matching module 122. In some approaches, the inspection device 106 acquires multiple sets of inspection data, for example, at different times. The inspection device 106 may acquire multiple sets of inspection data at any suitable time interval.

Further, the key point detection and matching module 122 may receive and analyzes inspection data collected by the inspection device 106. It is contemplated that, in some approaches, the key point detection and matching module 122 analyzes the inspection data in accordance with one or more of the inspection methods provided herein (e.g., inspection method 200, inspection method 500, method 700, or inspection method 900), which are described in detail below.

In some approaches, in operation, when the inspection device 106 is an imaging device, the key point detection and matching module 122 receives a first set of images from the inspection device 106. The first set of images may be from a first inspection of the plurality of parts 104. The first set of images includes images of a plurality of parts 104. For example, the first set of images may include images of airfoils, such as turbine blades in an engine. The key point detection and matching module 122 then analyzes the first set of images to detect key points for the first set of images. The key point detection and matching module 122 determines a first group of key points which includes key points for each image in the first set of images. The first group of key points includes key points on at least some of the plurality of parts 104, that is, it need not include key points for every part. The key point detection and matching module 122 then extracts a first group of feature descriptors. The first group of feature descriptors may include feature descriptors for each key point in the first group of key points.

The key point detection and matching module 122 further receives a second set of images from the inspection device 106. The second set of images includes images of at least some of the plurality of parts 104. The key point detection and matching module 122 then analyzes the second set of images to detect key points for the second set of images. The key point detection and matching module 122 determines a second group of key points which includes key points for each image in the second set of images. The second set of images may be from a second inspection of the plurality of parts 104. The second group of key points includes key points on at least some of the plurality of parts 104. The key point detection and matching module 122 then extracts a second group of feature descriptors. The second group of feature descriptors may include feature descriptors for each key point in the second group of key points.

Figure 3:
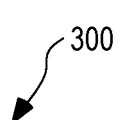
FIG. 3 is a simplified illustration of exemplary groupings of key points derived from inspection data, in accordance with some embodiments.

The key point detection and matching module 122 matches the first group of key points with the second group of key points using the first group of feature descriptors and the second group of feature descriptors. The matching process performed by the key point detection and matching module 122 may be described with reference to FIG. 3. FIG. 3 depicts an exemplary first set of images 1, 2, to n and second set of images 1, 2, to m. The key point detection and matching module 122 detects key points 1, 2, to i for each image in the first set of images and detects key points 1, 2, to j for each image in the second set of images.

For example, with reference to FIG. 3, the key point detection and matching module 122 may match key points in the first and second set of images as follows:

For each image n in the first set of images;
For each image m in the second set of images;
    For each key point i of the image n;
        For each key point j of the image m;
            determine a Euclidean distance between feature descriptors of key point j and feature descriptors of key point i;
            determine match between key point i and one of key points j of image m where Euclidean distance in set of j Euclidean distances is smallest;
        sum i Euclidean distances for i key points of image n to get value representing match between image n and image m;
    determine match between image n and one of images m where sum of Euclidean distances in set of m sums of Euclidean distance is smallest.

Figure 4:
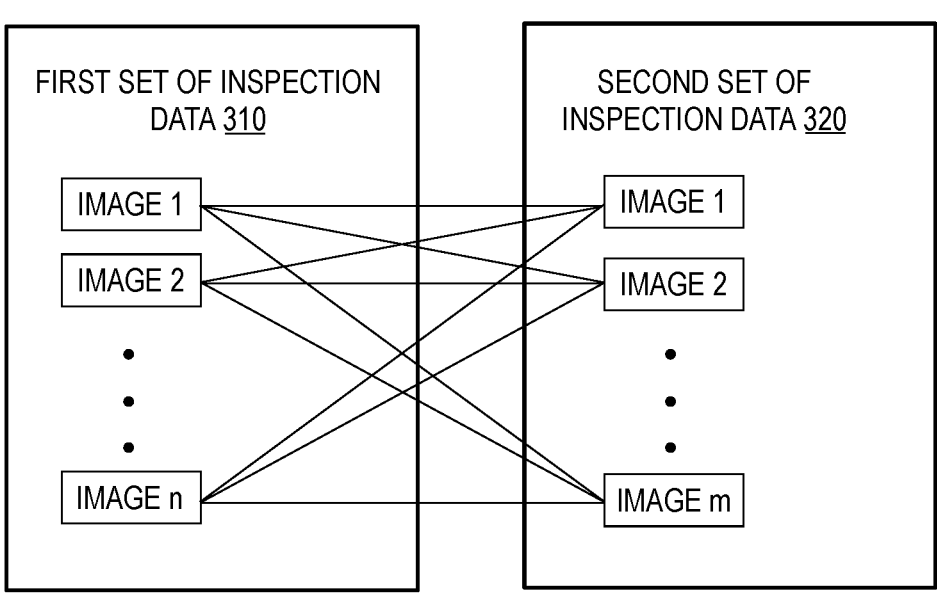
FIG. 4 is a simplified illustration of a matching process, in accordance with some embodiments.

For example, the key point detection and matching module 122 determines a Euclidean distance between the feature descriptors for key point i for image n of the first set of images and key point j for image m of the second set of images. Such Euclidean distances are determined for each possibly pairing of key point 1, 2, to i for image n and key point 1, 2, to j for image m. The key point detection and matching module 122 then determines matching key points between key points 1, 2, to i for image n and key points 1, 2, to j for image m based on where the Euclidean distance is the smallest. The key point detection and matching module 122 then determines a sum of the Euclidean distances for all of the matched key points to get a value representing the match between image m and image n. Such a value representing the match (i.e., the sum of Euclidean distances) is determined for each combination of matches between image n in the first set of images and images 1, 2, to m of the second set of images. The key point detection and matching module 122 then determines whether a match occurs between image n in the first set of images and one of images 1, 2, to m in the second set of images based on where the sum of the Euclidean distances is the smallest. The key point detection and matching module 122 performs this process for each image 1, 2, to n in the first set of images, as shown in FIG. 4 to determine a proper alignment of images between the two sets.

The key point detection and matching module 122 then associates at least one image in the first set of images with at least one image in the second set of images based on the matching of the first group of key points and the second group of key points. Matching performed by the matching module 122 may be employed to align datasets from the first inspection and the second inspection of the plurality of parts 104.

In some embodiments, all of the images from a first inspection may not by transferred to the second inspection to perform to perform matching using the matching module 122 in order to align the plurality of parts 104. Instead, the feature descriptors, without the images, may be transferred for matching. In this manner, the previously computed feature descriptors with the newly acquired imagery and the newly computed feature descriptors may be used to perform matching and to align the datasets from the first inspection and the second inspection. Such an approach may result in a time savings, for example, if network speeds are slow and/or it there is limited storage on the inspection device 106.

It is contemplated that the orientation of the inspection device 106 (e.g., a camera) does not have to be the same for the inspection of each part 104. That is the methods described herein (e.g., inspection method 200 and inspection method 500) will work regardless of the orientation of the inspection device2 106 with respect to the parts 104.

FIG. 2 illustrates a flow diagram of an inspection method 200, in accordance with some embodiments. The inspection method 200 may be employed to associate or link together inspection data from two or more inspections.

The inspection method 200 includes acquiring 202 a first set of inspection data for a plurality of parts or portions thereof. The plurality of parts may be parts of a rotational assembly. In some embodiments, the plurality of parts are airfoils, such as turbine blades in an engine. The first set of inspection data may, for example, include inspection data from a first inspection. The first inspection may be performed at a first time. In some approaches, the first set of inspection data includes inspection data for each part sought to be assessed pursuant to the inspection method 200.

The inspection method 200 further includes analyzing 204 the first set of inspection data to detect a first group of key points. In some aspects, analyzing 204 the first set of inspection data may include analyzing images of each the plurality of parts to detect key points on each image. The inspection method 200 may detect the first group of key points using any suitable approach of detecting key points, for example, any approach that identifies points in an image to positions on parts whose feature signatures are invariant to pose and imaging and/or measuring conditions such as lighting. A key point includes the location and size or scale of a feature at a location that defines a portion of an image. Examples of key points may include corners, edges, blobs, ridges, holes, other geometrical features, and the like as well as the size or scale and location coordinate of such features. In some approaches, the inspection method 200 detects the first group of key points using one or more of a scale-invariant feature transform (SIFT) algorithm, a speeded up robust features (SURF) algorithm, a features from accelerated segment test (FAST) algorithm, a binary robust independent elementary features (BRIEF) algorithm, an oriented FAST and rotated BRIEF (ORB) algorithm, and a superpoint algorithm. In some approaches, an ORB algorithm may detect hard corner-like features from an image and a number of intensity differences around the selected key point to describe the features.

The inspection method 200 also includes extracting 206 a first group of feature descriptors from the first group of key points. Feature descriptors may be described as feature vectors that define a point in a feature space. In some aspects, the feature descriptors are between about 8 bytes and 128 bytes, about 8 bytes and 32 bytes, about 8 bytes and 16 bytes. Different algorithms may employ different size feature descriptors. Feature descriptors encode information on key points into a series of numbers and act as a numerical fingerprint that can be used to differentiate one key point from another.

In addition, the inspection method 200 includes acquiring 208 a second set of inspection data for at least some of the plurality of parts. The second set of inspection data may, for example, include data from a second inspection. The second inspection may be performed at a second time, the second time being different from the first time. It is contemplated that the second set of inspection data does not need to include every part in the plurality of parts. For example, the second set of inspection data acquired at the second time does not need include inspection data for each part inspected at the first time.

The inspection method 200 further includes analyzing 210 the second set of inspection data to detect a second group of key points. Analyzing 210 may involve one or more of the algorithms described with reference to those described with reference to step 204. The inspection method 200 also includes extracting 212 a second group of feature descriptors from the second group of key points.

The inspection method 200 then includes matching 214 the first group of key points and the second group of key points using the first group of feature descriptors and the second group of feature descriptors. At step 214, the method may use any suitable process of key point matching. In some approaches, matching 214 is performed by comparing of the first group of feature descriptors to the second group of feature descriptors. Matching 214 may include matching key points based on the similarity of their feature descriptors. The similarity of feature descriptors may be determined by calculating a distance in feature space between key points, for example, by performing a minimum distance correlation. An exemplary process for matching 214 is described with reference to the key point detection and matching module 122 in FIG. 1. A minimum distance in feature space between key points indicates a proper alignment of the key points (e.g., a match) from the first set of inspection data and the second set of inspection data. The sum of minimum distances of matched key points indicates whether the first set of inspection data is properly aligned with the second set of inspection data. In this manner, the sum of the minimum distances of matched key points guides the alignment of inspection data from two different inspections or instances. Proper alignment of inspection data refers to when inspection data (e.g., an image) for a part from the first inspection is matched to inspection data (e.g., an image) of the same part from the second inspection.

In some approaches, matching 214 involves linking a feature descriptor in the first group of feature descriptors with a feature descriptor in the second group of feature descriptors. For each match that is made between a feature descriptor in the first group of feature descriptors and a feature descriptor in the second group of feature descriptors, a Euclidean distance is calculated between the coordinates for the matched feature descriptors in feature space. In some approaches, only a threshold number of the top matches between the first set of inspection data and the second set of inspection are selected and summed to calculate a summation of Euclidean distances. The threshold number of top matches may vary, for example, based on the number of parts or the geometry of the parts (e.g., different geometries may produce more or less feature descriptors).

For correct matches, the Euclidean distance in feature space between each of the matches will correspond to the perspective difference between images. That is, the same key point (i.e., from two different images of the same part) may have some differences in the feature space due to the perspective of the images or changes in the part over time. Thus, the Euclidean distance for correct key point matches reflects such perspective differences or changes in the part over time. For incorrect matches, the Euclidean distance in feature space represents the distance in feature space between two unrelated points. An incorrect matching of key points may result in a large Euclidean distance between two key points. Similarly, a correct matching of key points may result in a small Euclidean distance between two key points. An incorrect match will remove the possibility of a correct match for that key point. The summation of all of the Euclidean distances in feature space between key points is minimized when there is a proper alignment of the first set of inspection data and the second set of inspection data. That is, a maximum agreement between matches occurs when the summation of the Euclidian distances in feature space is at a minimum.

It is to be understood that any suitable technique for matching 214 key points or optimizing matches between the first group of key points and the second group of key points may be employed. Some approaches may consider different constraints or use an ensemble of techniques that might provide multiple hypothesis of matches. For example, some approaches may match the same point in the first group of key points to multiple points in the second group of key points.

In some approaches, matching 214 is performed for key points on an aggregate basis. That is, the pair-wise distance measurement between key points matched by their feature descriptors is performed among all parts in the plurality of parts (i.e., among all images for the plurality of parts). Such an approach may further refine the confidence measure in the alignment of data from two independent inspections. An exemplary process for matching 214 is illustrated in FIG. 4.

Next, the inspection method 200 may also include associating 216 at least a portion of the first set of inspection data with at least a portion of the second set of inspection data. As shown, for example, in FIG. 4 images from the first set of inspection data may be associated with images from the second set of inspection data based on correct matching of key points. In this manner, the inspection method 200 links inspection data from the first inspection of a part with the inspection data for that same part from the second inspection. Using inspection method 200, it is possible to align or link together inspection data for a particular part from two different inspections.

Once two sets of inspection data have been aligned or otherwise linked together, it is then possible to perform a comparative analysis between the two sets of inspection data. Such a comparative analysis may include, for example, human inspection or evaluation or automated defect detection algorithms. In some approaches, the comparative analysis may be used determine a rate of change (e.g., a wear rate), a remaining life, or an estimated maintenance schedule for a part. Accordingly, in some embodiments, the inspection method 200 may further include determining 218 a wear rate, an expected life, or a maintenance schedule for the particular part.

FIG. 3 illustrates a first set of inspection data 310 and a second set of inspection data 320, in accordance with some embodiments. In some approaches, the first set of inspection data 310 and the second set of inspection data 320 are collected by the inspection device 106 described with reference to FIG. 1.

The first set of inspection data 310 includes a plurality of images including image 1, image 2, to image n. Each image (i.e., image 1, image 2, to image n) corresponds to at least one part in a plurality of parts. In some approaches, the parts are ordered parts, that is, parts that are in a fixed arrangement or order such as the airfoils in a turbine engine. In some approaches, the plurality of parts may be parts of a rotational assembly. The first set of inspection data 310 is collected at a first instance or time. After the first set of inspection data 310 is collected, it is analyzed and, using key point detection, one or more key points (i.e., key point 1, key point 2, to key point i) are associated with image 1, image 2, to image n. While key points are illustrated on each of the images in FIG. 3 (i.e., image 1, image 2, to image n) it is contemplated that the inspection systems and methods employed herein would work should no key points be detected on some of the images. Feature descriptors 1, 2, to k are extracted for each key point.

The second set of inspection data 320 includes a plurality of images including image 1, image 2, to image m. Each image (i.e., image 1, image 2, to image m) corresponds to at least one part in the plurality of parts. The plurality of parts captured in the second set of inspection data 320 includes at least some of the plurality of parts captured in the first set of inspection data 310. Accordingly, the value "n" is not necessarily equal to the value "m", though in some approaches, "n" and "m" may be equal. The second set of inspection data 320 is collected at a second instance or time. The second instance or time may be before or after the first instance or time at which the first set of inspection data 310 is collected. After the second set of inspection data 320 is collected, the second set of inspection data 320 is analyzed and, using key point detection, one or more key points (i.e., key point 1, key point 2, to key point j) are associated with image 1, image 2, to image m. While key points are illustrated on each of the images in FIG. 3 (i.e., image 1, image 2, to image m) it is contemplated that the inspection systems and methods employed herein would work should no key points be detected on some of the images.

It is to be understood that, at the time of inspection, it may be unclear to which particular part in the plurality of parts each image in the first set of inspection data 310 corresponds. Similarly, it may be unclear to which particular part each image in the second set of inspection data 320 corresponds. Accordingly, the methods described herein may be used to analyze the first set of inspection data 310 and the second set of inspection data 320. Using the methods described herein, images in the first set of inspection data 310 may be aligned or linked together with images in the second set of inspection data 320.

To associate or link together images in the first set of inspection data 310 with images in the second set of inspection data 320, key point matching may be performed as described with reference to FIG. 2.

Turning to FIG. 4, a schematic diagram of a matching process 400 is illustrated. FIG. 4 shows key point matching between the first set of inspection data 310 and the second set of inspection data 320. The matching process 400 occurs on an aggregate basis. That is, the matching process 400 compares the key points on image 1, image 2, to image n in the first set of inspection data 310 with the key points on each of image 1, image 2, to image m in the second set of inspection data 320. The lines in FIG. 4 illustrate how key point matching occurs on such an aggregate basis. In particular, the matching process 400 matches key points on image 1 (i.e., key point 1, key point 2, to key point m) in the first set of inspection data 310 with key points on each of image 1, image 2, to image m in the second set of inspection data 320.

As discussed above, the matching process 400 performs key point matching using feature descriptors associated with key points on the images in the first set of inspection data 310 (i.e., image 1, image 2, to image n) and on the images in the second set of inspection data 320 (i.e., image 1, image 2, to image m). Feature descriptors are used to calculate distance measurements in feature space and analyzed to match key points. The lines between images 1, 2, to n and images 1, 2, to m represent a sum of the Euclidean distances for matched key points of the images. To determine if one of the lines is a match between images, for example, to determine a match between image n and one of images 1, 2, to m, the matching process 400 involves determining where the sum of the Euclidean distances is the smallest. That is, where the sum of the Euclidean distance is the smallest, there is a proper alignment or linking together of images in the first set of inspection data 310 with images in the second set of inspection data 320. In the exemplary matching process 400, such a proper alignment may be indicated where image 1 of the first set of inspection data 310 aligns with image 1 of the second set of inspection data 320 (as this is where the line representing the sum of Euclidean distances is the smallest).

In some aspects, when the plurality of parts are ordered parts having a fixed arrangement or order, it is contemplated that the matching process 400 may be done for a single image in the first set of inspection data 310 to each image in the second set of inspection data 320. In this manner, the matching process 400 only need occur for "m" number of images, reducing the number of different permutations of images compared in the matching process 400. In some approaches, it is also contemplated that a subset of images in the first set of inspection data 310 is compared to a subset of images in the second set of inspection data 320, provided the images have corresponding spacing in the ordered parts. For example, the first, fifth, and tenth image in the first set of inspection data 310 may be compared to the second, sixth, and eleventh image in the second set of inspection data 320. The ordering constraint is an optimization that allows two ordered sets, such as the first set of inspection data 310 (including images 1 to n) and the second set of inspection data 320 (including images 1 to m), with consistent spacing that allows for anywhere between 1×n and m×n comparisons to match images and determine proper alignment. It is contemplated, that comparing less than a complete set of images (i.e., between 1×n and m×n) allows for accommodation of partial assemblies and/or missing and/or broken parts in the assembly. However, the more images compared between the sets may result in a higher level of confidence.

In some approaches, the matching process 400 may be represented by the following formula:

```
Where 1 <= mm <= m
for i=1; i<= mm:
    for j=1; j<=m:
        # allows wrapping of set for different starting point of rotational
        alignment
        ii = (j    + i) % num_parts + 1
        jj = j + 1
        distance = sum(Euclidean distance of match reference set A[ii] to
        B[jj])
        if distance < min_distance:
            min_distance = distance
            rotational_alignment = i
```

When the plurality of parts are ordered parts, it is also contemplated that the matching process 400 may be performed in a forward direction (i.e., from an image of a first part to an image of the "m-th" part) and in a reverse direction (i.e., from an image of the last "m-th" part to an image of the first part). In this manner, the matching process 400 may also compare the matching in the forward direction to images in the reverse direction. For example, when the parts are parts in a rotational assembly, such as airfoils in an engine, the engine may turn the wrong way during inspection. In this manner, the matching process 400 may capture an appropriate matching when such a reversal occurs.

FIG. 5 provides a flow diagram of an inspection method 500, in accordance with some embodiments. The inspection method 500 may be employed to align or link together images from two or more inspections. The inspection method 500 is described with reference to two parts: a first part and a second part. However, it is also contemplated that the inspection method 500 may be employed to analyze image data for a plurality of parts.

The inspection method 500 includes acquiring 502 a first set of images including at least a first image of a first part and a first image of a second part. The inspection method 500 then includes analyzing 504 the first set of images to detect a first group of key points. The first group of key points includes both key points for the first part and key points for the second part. The inspection method 500 also includes extracting 506 a first group of feature descriptors for key points on the first part and the second part. In some approaches, the first group of feature descriptors includes a feature descriptor for each key point in the first group of key points.

In addition, the inspection method 500 includes acquiring 510 a second set of images including at least a second image of the first part and a second image of the second part. The inspection method 500 then includes analyzing 512 the second set of images to detect a second group of key points. The second group of key points includes both key points for the first part and key points for the second part. The inspection method 500 also includes extracting 514 a second group of feature descriptors for the first part and the second part. In some approaches, the second group of feature descriptors includes a feature descriptor for each key point in the second group of key points.

The inspection method 500 further includes matching 516 key points in the first group of key points to key points in the second group of key points. Matching 516 occurs based on the first group of feature descriptors and the second group of feature descriptors. In some approaches, matching 516 involves matching key points based on the similarity of their feature descriptors. Key points having similar feature descriptors in the first group of feature descriptors and in the second group of feature descriptors constitute matched key points. For example, the similarity of feature descriptors may be determined by calculating a distance in feature space between key points. A minimum distance in feature space between key points indicates a match between two key points. It is contemplated that any suitable method of key point matching may be employed at step 516. In some approaches, the methods of key point matching described with reference to FIG. 1 and FIG. 2 are employed at step 516.

After matching 516, in some embodiments, the inspection method 500 also includes calculating 518 a sum of the minimum distances in feature space between matched key points. The sum of the minimum distances of matched key points indicates whether the first set of images is properly aligned with the second set of images. In this manner, the sum of the minimum distances of matched key points guides the alignment of the first image of the first part with the second image of the first part from two different inspections or instances. Finally, the inspection method 500 includes associating 520 the first image of the first part with the second image of the first part based on a sum of minimum distances in feature space between matched key points. The inspection method 500 may also include associating 520 the first image of the second part with the second image of the second part.

In some embodiments, the inspection method 500 may further include comparing the first image of the first part to the second image of the first part to determine a wear rate or remaining life for the first part. In addition, in some embodiments, the inspection method 500 may also include analyzing the first image of the first part and the second image of the first part using one or more automated defect detection algorithms.

Figure 6A:
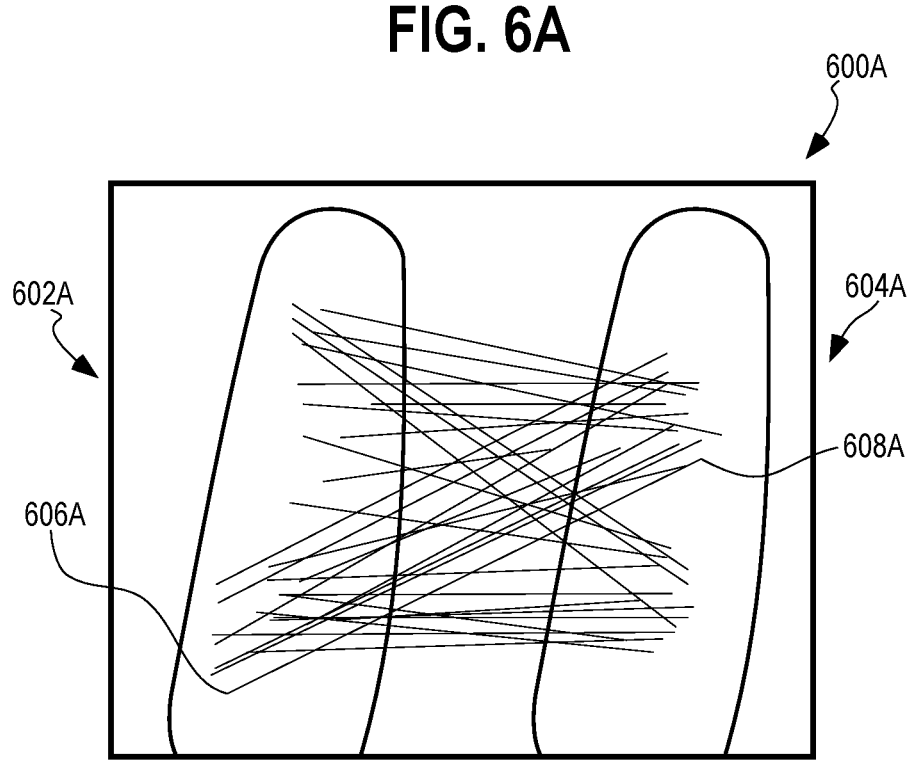
FIG. 6A is a simplified illustration showing a comparative analysis of images from different inspections.
Figure 6B:
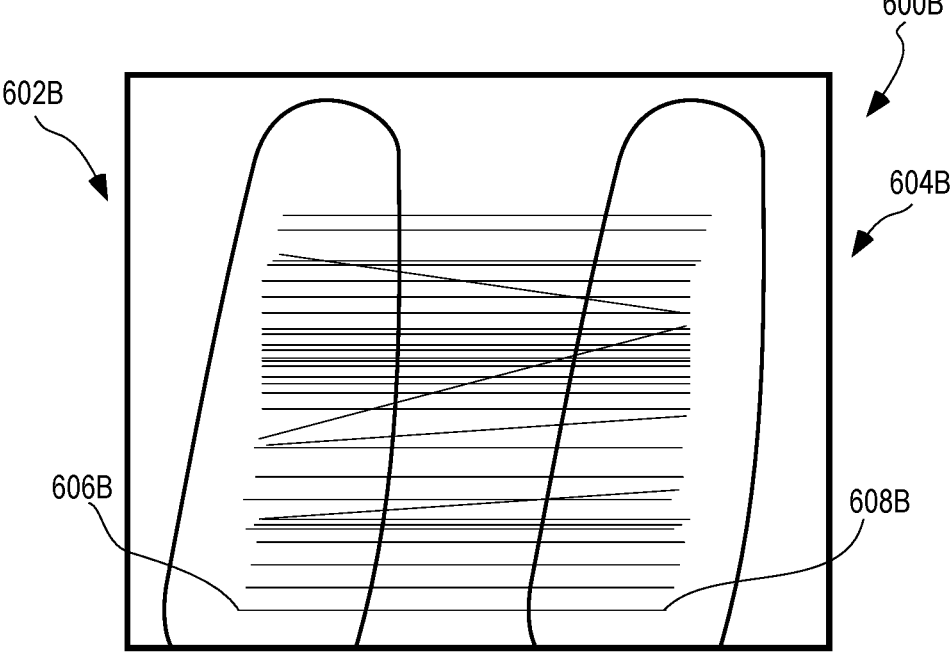
FIG. 6B is a simplified illustration showing a comparative analysis of images from different inspections.

FIGS. 6A and 6B are exemplary illustrations of a comparative analysis of images of a turbine blade from different inspections. In particular, FIGS. 6A and 6B provide images with key points identified during two different inspections (e.g., a first inspection and a second inspection). That is, the lines connect a feature on one image to its corresponding feature on another image. The lines show the matches between key points in the two images. As discussed above, matches between key points are determined by computing the Euclidean distance between feature descriptors in feature space. The match of key points as determined in feature space is depicted by the lines in FIGS. 6A and 6B. FIGS. 6A and 6B depict lines between image coordinates of matched key points in image space and, accordingly, provide a visualization to confirm a match between images.

FIG. 6A illustrates a comparison of features on two different blades from two different inspections. The first image 602A is an image of a turbine blade captured during a first inspection. The second image 604A is an image of different turbine blade captured during a second inspection. In FIG. 6A, there is extensive crossing of the lines that match features from one image to another image. The crossing or diagonal orientation of such lines indicate that the key points or features (e.g., a feature 606A and its corresponding feature 608A) are not spatially consistent from the first image 602A to the second image 604A. That is, the feature 606A on the first image 602A is not at the same position compared to the corresponding feature 608A on the second image 604A. These spatial inconsistencies between features on the first image 602A and the corresponding features on the second image 604A indicate the first image 602A captures a different part than the second image 604A. Accordingly, the first image 602A and the second image 604A are not properly aligned and the first image 602A may not be associated with the second image 604A for the purposes of inspection data analysis.

FIG. 6B illustrates a comparison of key points or features on the same blade from two different inspections. The first image 602B is an image of a turbine blade captured during a first inspection. The second image 604B is an image of the same turbine blade captured during a second inspection. In FIG. 6B, there are fewer crossing or diagonal lines than in FIG. 6A. For example, a feature 606B on the first image 602B is at approximately the same position as its corresponding feature 608B on the second image 604B. The spatial consistencies between features on the first image 602B and the corresponding features on the second image 604B indicate that the first image 602B captures the same turbine blade as the second image 604B. Accordingly, the first image 602B and the second image 604B are properly aligned and the first image 602B is properly associated with the second image 604B for the purposes of inspection data analysis.

When inspecting a part, in particular a part in a rotational assembly such as an airfoil within an engine, it may be difficult to fully assess indications on the part based on a single image. For example, lighting, surface conditions, or motion blur may make it difficult to assess indications based on a single image. Accordingly, it may be desirable to extract additional contextual images to capture the part rotating into and out of the field of view of an inspection device. For example, it may be desirable to select a set of images in poses that are adjacent to a target pose for a part for the inspection. Further, certain types of defect identification may be aided by different contextual images, for example by different view angles of a part when the rotational assembly moves into and/or out of the field of view.

FIG. 7 illustrates a flow diagram of a method 700 for extracting a keyframe and context frames for a target part. The context frames provide contextual images for the target part. One or more of the keyframe and the context frames may be used in inspection of the target part. The target part may be a part of a rotational assembly, such as an airfoil. The extracted images are used to provide context for the target part for an inspection. In this manner the method 700 may be used to augment inspection data and to provide additional imagery to support the evaluation of the target part for the inspection. It is contemplated that method 700 may be executed, in whole or in part, using the inspection system 100.

The method 700 includes acquiring 702 image data for a target part in a rotational assembly, the image data including a plurality of frames (i.e., images). In some approaches, the image data may be a video of the target part.

The method 700 also includes identifying 704 a keyframe for the target part by analyzing the plurality of frames against an objective function relative to a target pose. The objective function may provide some objective measure for each frame in the plurality of frames. When this objective measure is maximized (i.e., is at a peak) that indicates that a frame matches the target pose and, accordingly, should be selected as the keyframe for inspection. In some approaches, a window is set around the peak (e.g., within about 5% to about 20% of the peak and, in some aspects, within about 10% of the peak) to select the target frame. In other approaches, a primary objective function and a secondary objective function are employed to select the target pose. The primary objective function may be employed to select frames as candidate target poses by setting a window within a threshold of the peak (e.g., within about 5% to about 20% of the peak) of the primary objective function. The secondary objective function may then be employed to select the frames that have the best image quality from the candidate target poses.

Figure 8:
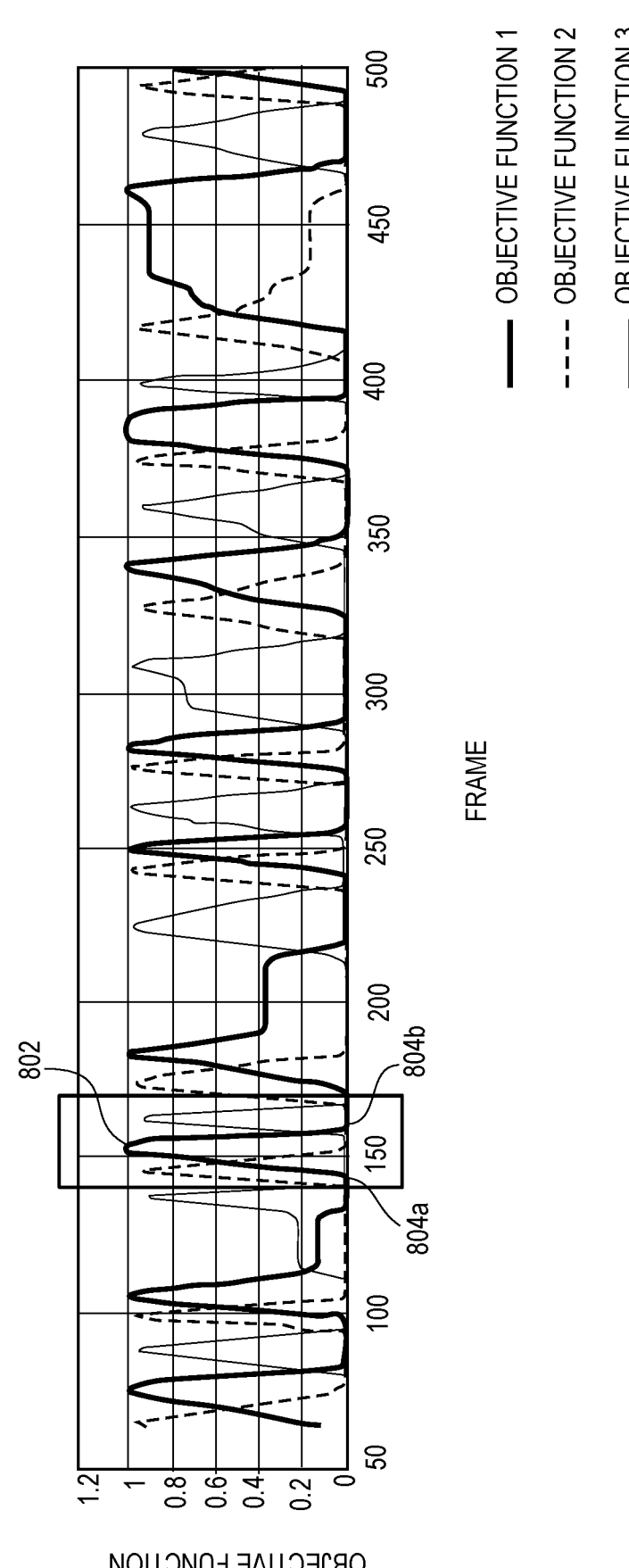
FIG. 8 is a graph of an objective function for selecting one or more keyframes and/or context frames.

In some approaches, the objective function for the plurality of frames may be graphed. Such a graph provides a curve that indicates the objective measure rising and falling with rotation of the rotational assembly as the target part being monitored enters and exits the target pose. In this manner, the peak (or maximum) of the objective function on the graph may be used to identify the keyframe for the target part. FIG. 8 illustrates an exemplary objective function showing a peak 802 of the objective function that identifies the keyframe.

The method 700 also includes determining 706 a rotational displacement for selecting at least one context frame based on the objective function. The rotational displacement for selecting the context frame(s) is calculated based on the objective function. In particular, the offsets on either shoulder on the peak of the objective function determine the rotational displacement for selecting the context frame(s). FIG. 8 illustrates an exemplary objective function showing offsets 804*a*, 804*b* on either shoulder of the peak 802.

The method 700 further includes selecting 708 at least one context frame from the plurality of frames based on the rotational displacement. Computer vision techniques may be used to select the context frame(s). For example, computer vision techniques may track the motion of the rotational assembly and select frames at the determined rotational displacement with reference to the keyframe. In this manner, the method 700 may provide a set of contextual frames around the keyframe. The set of contextual frames may be used to provide additional context to evaluate an indication during an inspection. For example, the set of contextual frames may include images of the target part in different poses than those captured in the keyframe.

In some approaches, one or more constraints may be set around the peak offsets to assess image quality. The constraints may select context frames having the sharpest or highest quality images to reduce or avoid motion blur, glare, or other defects associated with images in the context frames. For example, the method 700 may employ multiple objective functions to select a keyframe and context frame(s), such that the frames having the best image quality among the multiple objective functions may be selected.

It is contemplated that, in some approaches, image data for the selection of keyframes and context frames may include image data for multiple rotations of a rotational assembly. In this manner, the best images from both a rotational displacement (i.e., position) or image quality perspective may be selected.

Selecting contextual images according to the method 700 may reduce inspection time by allowing an inspector to focus on high value images rather than those that may be redundant. Selecting a set of contextual images in this manner may also prevent repeat inspections, for example, if an indication cannot be read from a single image. Further, selecting a set of contextual images, rather than storing full length video, for example, may be advantageous as the contextual images provide the information to support inspection while taking a fraction of the storage space.

FIG. 8 illustrates a graph 800 of exemplary objective functions that may be used to select keyframes and context frames for inspection data. In the graph 800, the x-axis represents the frame and the y-axis represents the objective function. The objective function provides an objective measure for each frame in the image data relative to a target pose. The frame at which the objective function is maximized matches the target pose. The peak 802 in the graph 800 illustrates the point at which the objective function is maximized and, accordingly, the frame at 802 indicates the target pose and is selected as a keyframe. The offsets 804*a*, 804*b* on either shoulder of the peak 802 illustrate the set of frames from which the context frame(s) should be selected.

In certain approaches, the inspection of a part may be impacted by the particular part revision. A part revision as used herein may refer to the particular design revision or models of a part. For various parts, such as parts in gas turbine engines, it is common for new or otherwise different part revisions to be introduced through the course of maintenance and/or servicing. Further, new part revisions may be introduced when an improvement is made to the design or engineering of a part which may benefit part life, cost, or serviceability. Different part revisions may have different inspection requirements or standards, for example, requirements or standards for determining return to service status for the part. Accordingly, identifying the part revision for a part may be important for inspection protocols or workflows.

A human inspector may be able to identify a particular part revision for a part from a visual inspection. For instance, sometimes a part identifier such as a serial number may be visible such that a part revision may be determined via visual inspection. In some embodiments, when the part is an airfoil such as a blade in a gas turbine engine, the part revision for the blade may be determined based on the pattern of cooling holes present on the blade. Thus, a human inspector may be able to identify a particular part revision by inspecting the cooling holes, for example, to identify the number of cooling holes in one or more rows of the blade.

However, it may be desirable to also have methods of automatically identifying a part revision to ensure that the proper maintenance procedures are performed. Further, it may be desirable to employ methods of automatically identifying a part revision to assist a human inspector. For example, such automated methods may refer the human inspector to a relevant part of an inspection or maintenance manual to ensure the human inspector is following proper procedures that are specific to the particular part revision.

Methods of automatically identifying part revisions are provided herein. The methods described herein may automatically identify or determine a part revision for a part based on differences in part appearance as determined from image data for the part. The methods employ machine learning approaches to identify the relationships between image data for a part (i.e., the part appearance) and the part revision. The methods then use these relationships to determine a part revision for a target part based on image data for the target part.

FIG. 9 illustrates an inspection method 900 that may be employed to identify or predict a part revision for a target part. In some embodiments, the target part is an airfoil in a gas turbine engine. Further, in some embodiments, the target part is a used part. In this manner, the target part may have undergone changes in appearance due to wear and/or the presence of dust and/or debris. It is contemplated that method the inspection method 900 may be executed, in whole or in part, using the inspection system 100.

The inspection method 900 includes collecting 902 labeled image data for a plurality of parts having a plurality of different part revisions. The labeled image data identifies a part revision for the plurality of parts. In some approaches, the labeled image data associates a label with an image of a part, the label identifying the part revision for the part in the image. In some embodiments, when the plurality of parts are airfoils, the labeled image data may associate a label identifying the part revision with one or more cooling holes in the image. Further, in some embodiments, the labeled image data may include labeled images for different part conditions, such as wear or dust accumulation.

The inspection method 900 also includes machine learning 904 relationships between the labeled image data and the plurality of part revisions to create a plurality of part revision identifiers. For example, machine learning is used to recognize patterns in the labeled image data that exist for various part revisions, such as spatial patterns in visual features of the parts. In some embodiments, when the plurality of parts are airfoils, the inspection method 900 may include machine learning relationships between the cooling hole patterns, cooling hole locations, the cooling hole geometries, and/or the context around the cooling holes and the part revisions. In this manner, the inspection method 900 leverages indirect features, such as weeping or other contextual features, linked to a cooling hole to determine relationships between image data and part revisions. For example, indirect features linked to a cooling hole may be used to identify the presence of a cooling hole. Further, the inspection method 900 leverages spatial relationships between cooling holes to determine relationships between image data and the part revisions.

The inspection method 900 also includes receiving 906 image data for a target part. In some approaches, the image data is received from one or more inspection devices. It is contemplated that the image data may include an image of a target part or a portion thereof.

The inspection method 900 further includes assigning 908, via a controller, a part revision identifier, of the plurality of part revision identifiers, to the target part. In this manner, the controller identifies or predicts the part revision for the target part. The part revision identifier is assigned is based on image data for the target part and the relationships between the labeled image data and the plurality of part revisions.

In some embodiments, the inspection method 900 may include creating 910 an inspection workflow for the target part based on the part revision identifier. Inspection workflows may differ based on the part revision. By creating or otherwise initiating an inspection workflow based the part revision, the inspection workflow may be tailored to the target part.

In some embodiments, the inspection method 900 may also include presenting 912 one or more prompts or queries via a user interface based on the inspection workflow. For example, the prompts or queries may be presented to an inspector to guide the inspector through an inspection workflow. The prompts may identify one or more parameters for an inspection of the target part based on the part revision. In some aspects, the prompts may include one or more portions of an inspection manual or protocol.

It is contemplated that the methods of identifying a part revision described herein may be effective under a broad range of part conditions, for example conditions in which the part has been subject to use or appearance changes due to dust, debris, or/and wear on the part. Under such conditions, physical features of the part or serial numbers physically present on the part may not be visible. For example, the methods of identifying a part revision described herein may be effective to identify part revisions for blades that include cooling hole blockages or missing serial numbers. Accordingly, the methods described herein may be able to properly determine a part revision for the blade under circumstances where such a determination would be difficult via human inspection.

Example 1

In one example, inspection data for a turbine blade assembly in an engine was analyzed in accordance with the methods described herein. The turbine blade assembly included 62 blades in the first stage of the high-pressure turbine blades. A chamfer was positioned on a corner of the first turbine blade in the assembly to establish a reference to align subsequent inspection data. It is to be understood that Example 1 provides a non-limiting example and that the methods and systems described herein may be applied to various engine models and stages of blades within the same engine which have a different number of blades.

Inspection data in the form of images was captured for each of the 62 turbine blades during five inspections. The first inspection occurred after 975 cycles of the engine. As used in this example, the number of cycles refers to cycles of take-off and landing for an aircraft powered by the engine. The second inspection occurred after 1175 cycles of the engine. The third inspection occurred after 1275 cycles of the engine. The fourth inspection occurred after 1367 cycles of the engine. The fifth inspection occurred after 1460 cycles of the engine.

During the first inspection, the second inspection, the third inspection, and the fourth inspection, the chamfer remained present on the first turbine blade. Accordingly, images from the first inspection, the second inspection, the third inspection, and the fourth inspection could be aligned using the chamfer as a reference point. However, for the fifth inspection, wear occurred near the chamfer and, accordingly, the chamfer could not serve as a reliable reference point to align images from the fifth inspection with images from the four prior inspections. Accordingly, the methods described herein using key point detection and matching were used to align the images from the fifth inspection with each of the first inspection, the second inspection, the third inspection, and the fourth inspection.

For each inspection (i.e., the first inspection, the second inspection, the third inspection, the fourth inspection, and the fifth inspection), a dataset was collected including images for each of the 62 blades. For each dataset, key points were detected and feature descriptors were extracted from each image, that is, for each of the 62 blades.

Figure 10:
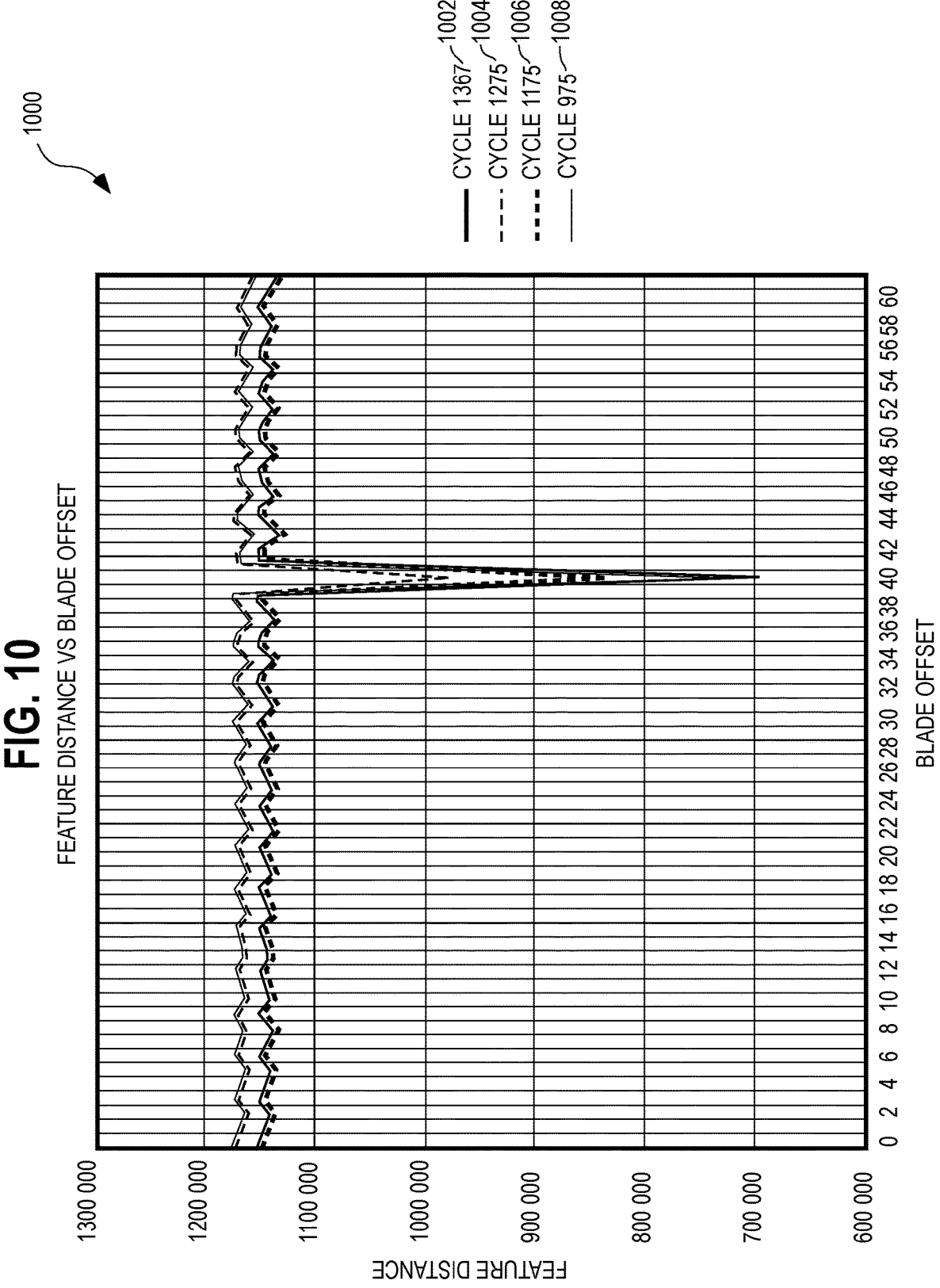
FIG. 10 is a graph illustrating the alignment of parts of a rotational assembly, in accordance with some embodiments.

FIG. 10 illustrates the longitudinal alignment of the inspection data for the blades in the turbine assembly. Such a longitudinal alignment enables the analysis of blades in the turbine blade assembly over time to objectively assess the same blade over time. Longitudinal alignment also facilitates the subsequent progression of damage between time points on the same blade.

Specifically, FIG. 10 illustrates the alignment of inspection data from the fifth inspection with each of the first inspection, the second inspection, the third inspection, and the fourth inspection. The X-axis represents the blade offset or clocking positions, which describe the orientation or rotational position of the turbine blade assembly. In FIG. 10, there are 62 possible clocking positions, one for each of the 62 blades in the turbine blade assembly. Only one of the clocking positions represents two datasets from the different inspections being properly aligned. The Y-axis represents the feature distance in feature space at each blade offset position. The feature distances depicted on the Y-axis in FIG. 10 are a summation of Euclidian distances in feature space between matched key points on a reference dataset and a target dataset. For each clocking position, the top 500 matches between the reference dataset and the target dataset from the set of feature descriptors for each of the 62 blades, for each of the 62 clocking positions were selected. From these top 500 matches, a summation of the Euclidean distances in feature space for matched key points was computed to derive the value on the Y-axis. When there is a proper alignment between the datasets from two different inspections, the Y-axis reaches a minimum.

Line 1002 represents the alignment of images from the fifth inspection (e.g., at cycle 1470) with images from the first inspection (e.g., at cycle 975). For line 1002, the first inspection served as the reference data set and the fifth inspection served as the target data set. When the clocking is correct between the images from the fifth inspection and the first inspection, that is, when images of the same turbine blades are properly matched between the fifth inspection and the first inspection, the feature distance in feature space represented by line 1002 is at a minimum. Line 1002 reaches a minimum at a clocking position of 40.

Line 1004 represents the alignment of images from the fifth inspection (e.g., at cycle 1470) with images from the second inspection (e.g., at cycle 1175). For line 1004, the second inspection served as the reference data set and the fifth inspection served as the target data set. When the clocking is correct between the images from the fifth inspection and the second inspection, that is, when images of the same turbine blades are properly matched between the fifth inspection and the second inspection, the feature distance in feature space represented by line 1004 is at a minimum. Line 1004 reaches a minimum at a clocking position of 40.

Line 1006 represents the fifth inspection (e.g., at cycle 1470) with images from the third inspection (e.g., at cycle 1275). For line 1006, the third inspection served as the reference data set and the fifth inspection served as the target data set. When the clocking is correct between the images from the fifth inspection and the third inspection, that is, when images of the same turbine blades are properly matched between the fifth inspection and the first inspection, the feature distance in feature space represented by line 1006 is at a minimum. Line 1006 reaches a minimum at a clocking position of 40.

Line 1008 represents the alignment of images from the fifth inspection (e.g., at cycle 1470) with images from the fourth inspection (e.g., at 1367). For line 1008, the fourth inspection served as the reference data set and the fifth inspection served as the target data set. When the clocking is correct between the images from the fifth inspection and the fourth inspection, that is, when images of the same turbine blades are properly matched between the fifth inspection and the fourth inspection, the feature distance in feature space represented by line 1008 is at a minimum. Line 1008 reaches a minimum at a clocking position of 40.

Figure 11:
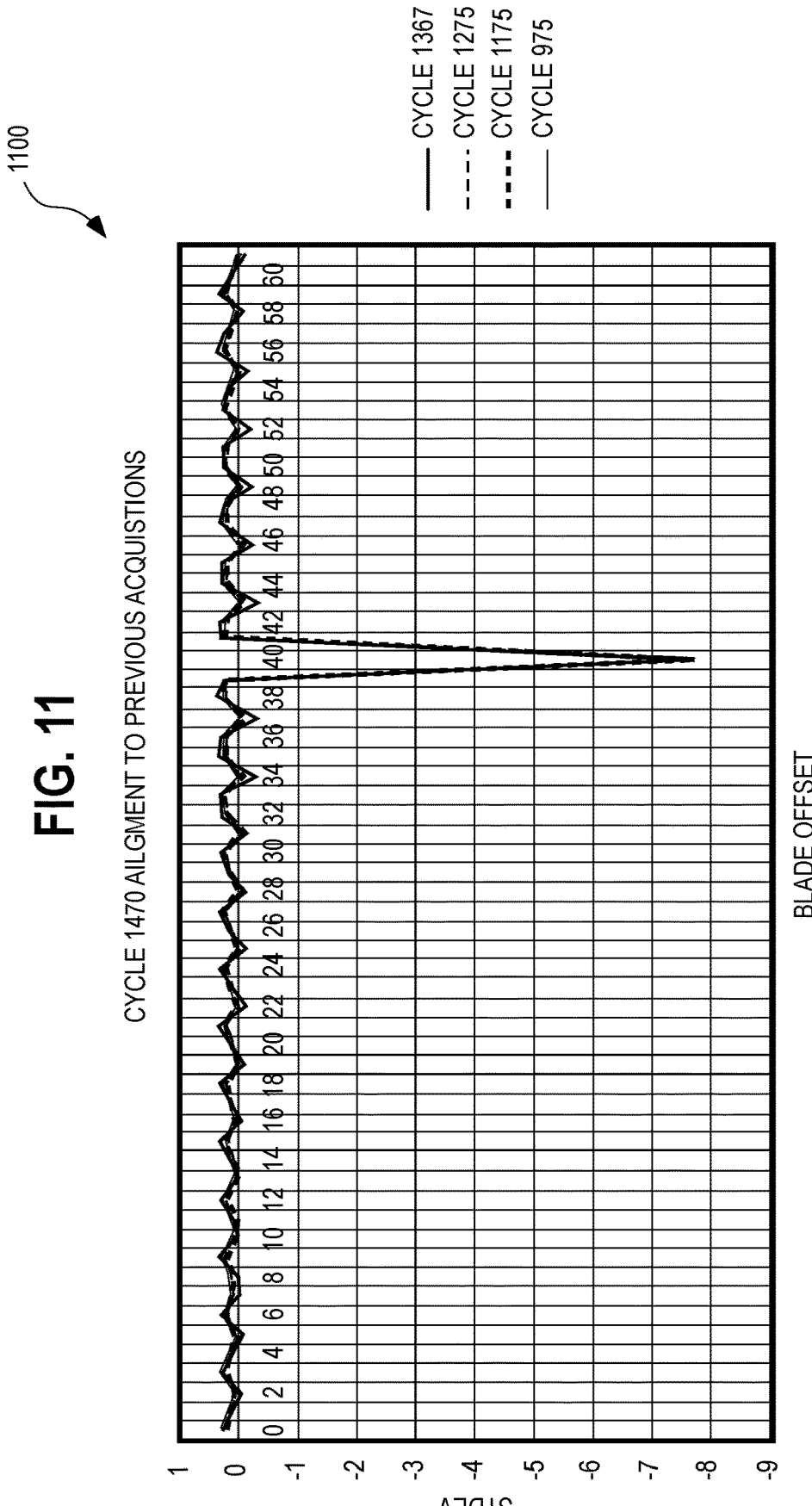
FIG. 11 is a graph illustrating the alignment of parts of a rotational assembly, in accordance with some embodiments.

FIG. 11 illustrates the data from the graph in FIG. 10, normalized by showing deviations from the mean of the Euclidean distances in feature space. In FIG. 11, the X-axis represents blade offset or clocking position. The Y-axis represents deviations from the mean difference. The mean is the mean of the Euclidean distances in feature space calculated for all clocking positions for a particular inspection (i.e., calculated for the inspection after cycle 1367, for the inspection after cycle 1275, for the inspection after cycle 1175, and the inspection after cycle 975). The mean difference is the difference between the sum of Euclidean distances in feature space at each clocking position (i.e., the value on the Y-axis) and the mean. Then, for the value shown on the Y-axis, the mean difference is divided by the standard deviation in the mean.

Further aspects of the disclosure are provided by the subject matter of the following clauses:

An inspection system comprising: one or more inspection devices; a control unit having at least one processor and at least one memory device, the at least one memory device storing instructions that when executed by the at least one processor causes the at least one processor to perform operations, the at least one processor configured to: receive a first set of images from the one or more inspection devices, the first set of images including images of a plurality of parts; analyze the first set of images to detect a plurality of first groups of key points, each first group of key points associated with one of the first set of images; extract a plurality of first groups of feature descriptors, each first group of feature descriptors associated with one of the key points in a first group of key points; receive a second set of images from the one or more inspection devices, the second set of images including images of at least some the plurality of parts; analyze the second set of images to detect a plurality of second groups of key points, each second group of key points associated with one of the second set of images; extract a plurality of second groups of feature descriptors, each second group of feature descriptors associated with one of the key points in a second group of key points; determine Euclidean distances between feature descriptors in the plurality of first groups of feature descriptors and feature descriptors in the plurality of second groups of feature descriptors; for each first group of key points, determine matches between key points in the first group of key points and key points in one of the plurality of second groups of key points based on the Euclidean distances to obtain a plurality of matched key points; for each image in the first set of images, determine a sum of the Euclidean distances for the plurality of matched key points; and determine matches between at least one image in the first set of images and at least one image in the second set of images based on the sum of the Euclidean distances.

The inspection system of any preceding clause, wherein the one or more inspection devices includes at least one of a camera, an eddy current instrument, an infrared detector, a computerized tomography scanner, a flexible borescope, a rigid borescope, a flexible endoscope, a rigid endoscope, and an X-ray fluorescence spectrometer.

The inspection system of any preceding clause, wherein the plurality of parts are rotary parts, and wherein at least one of the one or more inspection devices is coupled to a stationary component and configured to capture images of the rotary parts.

The inspection system of any preceding clause, wherein the plurality of parts are airfoils.

The inspection system of any preceding clause, wherein the plurality of parts are stationary parts, and wherein the at least one of the one or more inspection devices is coupled to a rotary component and configured to capture images of the stationary parts.

An inspection method comprising: acquiring a first set of inspection data, the first set of inspection data including inspection data for a plurality of ordered parts; analyzing the first set of inspection data to detect a plurality of first groups of key points, each first group of key points associated with inspection data for one of the plurality of ordered parts; extracting a plurality of first groups of feature descriptors, each first group of feature descriptors associated with one of the key points in a first group of key points; acquiring a second set of inspection data, the second set of inspection data including inspection data for at least some the plurality of ordered parts; analyzing the second set of inspection data to detect a plurality of second groups of key points, each second group of key points associated with inspection data for one of the plurality of ordered parts; extracting a plurality of second groups of feature descriptors, each second group of feature descriptors associated with one of the key points in a second group of key points; determining Euclidean distances between feature descriptors in the plurality of first groups of feature descriptors and feature descriptors in the plurality of second groups of feature descriptors; for each first group of key points, determining matches between key points in the first group of key points and key points in one of the plurality of second groups of key points based on the Euclidean distances to obtain a plurality of matched key points; for each first group of key points, determining a sum of the Euclidean distances for the plurality of matched key points; and associating a portion of the first set of inspection data and a portion of the second set of inspection data with a particular part in the plurality of ordered parts based on the sums of the Euclidean distances.

The inspection method of any preceding clause, wherein the first set of inspection and the second set of inspection data are captured via one or more inspection devices including at least one of a camera, an eddy current instrument, an infrared detector, a computerized tomography scanner, a flexible borescope, a rigid borescope, a flexible endoscope, a rigid endoscope, and an X-ray fluorescence spectrometer.

The inspection method of any preceding clause, wherein the image data includes an image of at least a portion of at least one of the plurality of ordered parts.

The inspection method of any preceding clause, wherein the first group of key points and the second group of key points are identified using at least one of: a scale-invariant feature transform (SIFT) algorithm, a speeded up robust features (SURF) algorithm, a features from accelerated segment test (FAST) algorithm, a binary robust independent elementary features (BRIEF) algorithm, an oriented FAST and rotated BRIEF (ORB) algorithm, and a superpoint algorithm.

The inspection method of any preceding clause, wherein the second set of inspection data is acquired at a time after the first set of images is acquired.

The inspection method of any preceding clause, wherein the Euclidean distances are calculated in feature space.

The inspection method of any preceding clause, wherein the first group of key points and the second group of key points are indicative of features on at least some of the plurality of ordered parts.

The inspection method of any preceding clause, wherein the first group of feature descriptors include numeric identifiers indicative of a location in an assembly relative to a reference unique to a first inspection; and wherein the second group of feature descriptors include numeric identifiers indicative of a location in the assembly relative to a reference unique to a second inspection.

The inspection method of any preceding clause, wherein the plurality of ordered parts are parts of a rotational assembly.

The inspection method of any preceding clause, wherein matching includes comparing at least one feature descriptor in the first group of feature descriptors to each of the feature descriptors in the second group of feature descriptors.

The inspection method of any preceding clause, further comprising: determining a rate of change or an expected life for the particular part based on the portion of the first set of inspection data and the portion of the second set of inspection data.

An inspection method comprising: acquiring a first set of images including at least a first image of a first part and a first image of a second part; analyzing the first set of images to detect a first group of key points for the first part and a first group of key points for the second part; extracting feature descriptors for each key point in the first group of key points for the first part and for each key point in the first group of key points for the second part; extracting a first group of feature descriptors for the first group of key points for the first part and a first group of feature descriptors for the first group of key points for the second part; acquiring a second set of images including at least a second image of the first part and a second image of the second part; analyzing the second set of images to detect a second group of key points for the first part and a second group of key points for the second part; extracting a second group of feature descriptors for the first group of key points for the first part and a second group of feature descriptors for the second group of key points for the second part; determining a set of Euclidean distances, the set of Euclidean distances including a Euclidean distance between the feature descriptors of each key point in the first group of key points for the first part and the feature descriptors of each key point in the second group of key points for the first part; determining matches between key points in the first group of key points for the first part and key points in the second group of key points for the first part based on the set of Euclidean distances to obtain a plurality of matched key points; determining a sum of the Euclidean distances for the plurality of matched key points; and determining a match between the first image of the first part and the second image of the first part based on the sum of Euclidean distances.

The inspection method of any preceding clause, further comprising: determining a match between the first image of the second part and the second image of the second part based on the sum of the Euclidean distances.

The inspection method of any preceding clause, comparing the first image of the first part with the second image of the first part to determine a rate of change or remaining life for the first part.

The inspection method of any preceding clause, analyzing the first image of the first part and the second image of the first part using one or more automated defect detection algorithms.

An inspection system, comprising: at least one imaging device; at least one processor communicable with the at least one imaging device, the processor configured to: acquire image data for a target part in a rotational assembly, the image data including a plurality of frames; identify a keyframe for the target part by analyzing the plurality of frames against an objective function relative to a target pose; determine a rotational displacement for selecting at least one context frame based on the objective function; and select the at least one context frame from the plurality of frames based on the rotational displacement.

The inspection system of any preceding clause, wherein the image data is a video of the target part.

The inspection system of any preceding clause, wherein identifying the keyframe for the target part includes determining a peak of the objective function.

The inspection system of any preceding clause, wherein determining the rotational displacement for selecting at least one context frame includes determining an offset of at least one shoulder of the peak of the object function.

The inspection system of any preceding clause, wherein target part is an airfoil.

The inspection system of any preceding clause, wherein the processor is further configured assess the image quality of the plurality of frames and to select the context frame based on the image quality of the plurality of frames.

The inspection system of any preceding clause, wherein the imaged data includes image data for multiple rotations of the rotational assembly.

An inspection system, comprising: at least one imaging device; at least one processor communicable with the at least one imaging device, the processor configured to: collect labeled image data for a plurality of parts having a plurality of different part revisions, the labeled image data identifying a part revision for the plurality of parts; machine learn relationships between the labeled image data and the part revisions based on the collected labeled image data to create a plurality of part revision identifiers; receive image data for a target part from the at least one imaging device; and assign, via a controller, a part revision identifier of the plurality of part revision identifiers to the target part, wherein the part revision identifier is assigned based on the image data for the target part and the relationships between the labeled image data and the part revisions.

The inspection system of any preceding clause, wherein the plurality of parts and the target part are used parts.

The inspection system of any preceding clause, wherein the plurality of parts and the target parts are airfoils.

The inspection system of any preceding clause, wherein the labeled image data includes images of cooling hole patterns on the airfoils, and wherein the processor is configured to machine learn relationships between the cooling hole patterns and the part revision based on the collected labeled image data.

An inspection method, comprising: collecting labeled image data for a plurality of parts having a plurality of different part revisions, the labeled image data identifying a part revision for the plurality of parts; machine learning relationships between the labeled image data and the part revisions based on the collected data to create a plurality of part revision identifiers; receiving image data for a target part; assigning, via a controller, a part revision identifier of the plurality of part revision identifiers to the target part, wherein the part revision identifier is assigned based on the image data for the target part and the relationships between the labeled image data and the part revisions; creating an inspection workflow for the target part based on, at least in part, the part revision identifier; and presenting one or more prompts or queries via a user interface to guide an inspector through an inspection based on the inspection workflow.

The inspection method of any preceding clause, wherein the plurality of parts and the target part are used parts.

The inspection method of any preceding clause, wherein the plurality of parts and the target parts are airfoils.

The inspection method of any preceding clause, wherein the labeled image data includes images of cooling hole patterns on the airfoils, and wherein the processor is configured to machine learn relationships between the cooling hole patterns and the part revision based on the collected labeled image data.

The inspection method of any preceding clause, wherein the inspection method further includes automatically identifying at least parameter for the inspection based on the part revision identifier.

It will be understood that various changes in the details, materials, and arrangements of parts and components which have been herein described and illustrated to explain the nature of the dynamic seals between moving components and stationary components may be made by those skilled in the art within the principle and scope of the appended claims. Furthermore, while various features have been described with regard to particular embodiments, it will be appreciated that features described for one embodiment also may be incorporated with the other described embodiments.

What is claimed is:

1. An inspection system comprising:

one or more inspection devices;

a control unit having at least one processor and at least one memory device, the at least one memory device storing instructions that when executed by the at least one processor causes the at least one processor to perform operations, the at least one processor configured to:

receive a first set of ordered images from the one or more inspection devices, each image in the first set of ordered images corresponding to a particular part of a plurality of ordered parts, images in the first set of ordered images being ordered in a fixed arrangement relative to each other;

analyze the first set of ordered images to detect a plurality of first groups of key points, each first group of key points associated with one of the first set of ordered images;

extract a plurality of first groups of feature descriptors, each first group of feature descriptors associated with one of the key points in a first group of key points;

receive a second set of ordered images from the one or more inspection devices, the second set of ordered images including images of at least some of the plurality of ordered parts, wherein it is unknown to which particular part of the plurality of ordered parts each image in the second set of ordered images corresponds, images in the second set of ordered images being ordered in a fixed arrangement relative to each other, wherein the second set of ordered images and the first set of ordered images define a plurality of possible orientations for aligning the second set of ordered images relative to the first set of ordered images;

analyze the second set of ordered images to detect a plurality of second groups of key points, each second group of key points associated with one of the second set of ordered images;

extract a plurality of second groups of feature descriptors, each second group of feature descriptors associated with one of the key points in a second group of key points;

determine Euclidean distances between feature descriptors in the plurality of first groups of feature descriptors and feature descriptors in the plurality of second groups of feature descriptors for the plurality of possible orientations;

for each first group of key points, determine matches between key points in the first group of key points and key points in each second group of key points based on the Euclidean distances to obtain a plurality of matched key points for the plurality of possible orientations;

for each image in the first set of ordered images, determine a sum of the Euclidean distances for the plurality of matched key points for the plurality of possible orientations; and link images in the first set of ordered images with images in the second set of ordered images based on the sums of the Euclidean distances for the plurality of matched key points for the plurality of possible orientations.

2. The inspection system of claim 1, wherein the one or more inspection devices includes at least one of a camera, an eddy current instrument, an infrared detector, a computerized tomography scanner, a flexible borescope, a rigid borescope, a flexible endoscope, a rigid endoscope, and an X-ray fluorescence spectrometer.

3. The inspection system of claim 1, wherein the plurality of ordered parts are rotary parts, and wherein at least one of the one or more inspection devices is coupled to a stationary component and configured to capture images of the rotary parts.

4. The inspection system of claim 3, wherein the plurality of ordered parts are stationary parts, and wherein the at least one of the one or more inspection devices is coupled to a rotary component and configured to capture images of the stationary parts.

5. The inspection system of claim 1, wherein the plurality of ordered parts are airfoils.

6. The inspection system of claim 1, wherein linking images includes matching images in the first set of ordered images with particular images in the second set of ordered images to generate matched images that correspond to the same part.

7. The inspection system of claim 1, wherein the at least one processor is further configured to determine that at least one image in the first set of ordered images and at least one image in the second set of ordered images are not properly matched based on the sum of the Euclidean distances.

8. An inspection method comprising:

acquiring a first set of inspection data comprising a first plurality of ordered images with each image in the first plurality of ordered images corresponding to a particular part of a plurality of ordered parts, images in the first plurality of ordered images being ordered in a fixed arrangement relative to each other;

analyzing the first set of inspection data to detect a plurality of first groups of key points, each first group of key points associated with inspection data for one of the plurality of ordered parts;

extracting a plurality of first groups of feature descriptors, each first group of feature descriptors associated with one of the key points in a first group of key points;

acquiring a second set of inspection data comprising a second plurality of ordered images of at least some of the plurality of ordered parts, wherein it is unknown to which particular part of the plurality of ordered parts each image in the second plurality of ordered images corresponds, images in the second plurality of ordered images being ordered in a fixed arrangement relative to each other, wherein the second plurality of ordered images and the first plurality of ordered images define a plurality of possible orientations for aligning the second plurality of ordered images relative to the first plurality of ordered images;

analyzing the second set of inspection data to detect a plurality of second groups of key points, each second group of key points associated with inspection data for one of the plurality of ordered parts;

extracting a plurality of second groups of feature descriptors, each second group of feature descriptors associated with one of the key points in a second group of key points;

determining Euclidean distances between feature descriptors in the plurality of first groups of feature descriptors and feature descriptors in the plurality of second groups of feature descriptors for the plurality of possible orientations;

for each first group of key points, determining matches between key points in the first group of key points and key points in each second group of key points based on the Euclidean distances to obtain a plurality of matched key points for the plurality of possible orientations;

for each first group of key points, determining a sum of the Euclidean distances for the plurality of matched key points for the plurality of possible orientations; and linking images in the first set of inspection data with images in the second set of inspection data based on the sum of the Euclidean distances for the plurality of matched key points for the plurality of possible orientations.

9. The inspection method of claim 8, wherein the first set of inspection data and the second set of inspection data are captured via one or more inspection devices including at least one of a camera, an eddy current instrument, an infrared detector, a computerized tomography scanner, a flexible borescope, a rigid borescope, a flexible endoscope, a rigid endoscope, and an X-ray fluorescence spectrometer.

10. The inspection method of claim 8, wherein the inspection data includes an image of at least a portion of at least one of the plurality of ordered parts.

11. The inspection method of claim 8, wherein the first group of key points and the second group of key points are identified using at least one of: a scale-invariant feature transform (SIFT) algorithm, a speeded up robust features (SURF) algorithm, a features from accelerated segment test (FAST) algorithm, a binary robust independent elementary features (BRIEF) algorithm, an oriented FAST and rotated BRIEF (ORB) algorithm, and a superpoint algorithm.

12. The inspection method of claim 8, wherein the second set of inspection data is acquired at a time after the first set of inspection data is acquired.

13. The inspection method of claim 8, wherein the Euclidean distances are calculated in feature space.

14. The inspection method of claim 8, wherein the first group of key points and the second group of key points are indicative of features on at least some of the plurality of ordered parts.

15. The inspection method of claim 8, wherein the first groups of feature descriptors include numeric identifiers indicative of a location in an assembly relative to a reference unique to a first inspection; and wherein the second groups of feature descriptors include numeric identifiers indicative of a location in the assembly relative to a reference unique to a second inspection.

16. The inspection method of claim 8, wherein the plurality of ordered parts are parts of a rotational assembly, and wherein the inspection method further includes determining a clocking position that defines a rotational position of the parts of the rotational assembly to link the images in the first set of inspection data with the images in the second set of inspection data.

17. The inspection method of claim 8, wherein matching includes comparing at least one feature descriptor in the first groups of feature descriptors to each of the feature descriptors in the second groups of feature descriptors.

18. The inspection method of claim 8, further comprising:

determining a rate of change or an expected life for the particular part based on a portion of the first set of inspection data and a portion of the second set of inspection data.

19. An inspection method comprising:

acquiring a first set of ordered images including at least a first image of a first part and a first image of a second part;

analyzing the first set of ordered images to detect a first group of key points for the first part and a first group of key points for the second part;

extracting a first group of feature descriptors for the first group of key points for the first part and a first group of feature descriptors for the first group of key points for the second part;

acquiring a second set of ordered images including at least a second image of the first part and a second image of the second part, wherein it is unknown to which of the first part and the second part each image in the second set of ordered images corresponds, images in the second set of ordered images being ordered in a fixed arrangement relative to each other, wherein the second set of ordered images and the first set of ordered images define a plurality of possible orientations for aligning the second set of ordered images relative to the first set of ordered images;

analyzing the second set of ordered images to detect a second group of key points for the first part and a second group of key points for the second part;

extracting a second group of feature descriptors for the first group of key points for the first part and a second group of feature descriptors for the second group of key points for the second part;

determining a set of Euclidean distances for the plurality of possible orientations, the set of Euclidean distances including a Euclidean distance between the feature descriptors of each key point in the first group of key points for the first part and the feature descriptors of each key point in the second group of key points for the first part and the feature descriptors of each key point in the second group of key points for the second part;

determining matches between key points in the first group of key points for the first part and key points in the second group of key points for the first part and key points in the second group of key points for the second part based on the set of Euclidean distances to obtain a plurality of matched key points for the plurality of possible orientations;

determining a sum of the set of Euclidean distances for the plurality of matched key points for the plurality of possible orientations; and linking the first image of the first part with the second image of the first part and the first image of the second part with the second image of the second part based on the sums of the Euclidean distances for the plurality of matched key points for the plurality of possible orientations.

20. The inspection method of claim 19, further comprising:

determining a match between the first image of the second part and the second image of the second part based on the sum of the set of Euclidean distances.

21. The inspection method of claim 19, further comprising:

comparing the first image of the first part with the second image of the first part to determine a rate of change or remaining life for the first part.

22. The inspection method of claim 19, further comprising:

analyzing the first image of the first part and the second image of the first part using one or more automated defect detection algorithms.

* * * * *